(12) United States Patent
Pizlo et al.

(10) Patent No.: US 11,860,996 B1
(45) Date of Patent: Jan. 2, 2024

(54) SECURITY CONCEPTS FOR WEB FRAMEWORKS

(71) Applicant: Apple Inc., Cupertino, CA (US)

(72) Inventors: Filip J. Pizlo, Capitola, CA (US); Yin Zin Mark Lam, Milpitas, CA (US); Jean-Francois Bastien, Sunnyvale, CA (US); Michael L. Saboff, San Jose, CA (US)

(73) Assignee: Apple Inc., Cupertino, CA (US)

( * ) Notice: Subject to any disclaimer, the term of this patent is extended or adjusted under 35 U.S.C. 154(b) by 922 days.

(21) Appl. No.: 16/376,091

(22) Filed: Apr. 5, 2019

Related U.S. Application Data

(60) Provisional application No. 62/653,608, filed on Apr. 6, 2018.

(51) Int. Cl.
  *G06F 21/54* (2013.01)
  *G06F 21/12* (2013.01)
  *G06F 9/455* (2018.01)
  *G06F 9/445* (2018.01)
  *G06F 8/41* (2018.01)

(52) U.S. Cl.
  CPC .............. *G06F 21/54* (2013.01); *G06F 8/434* (2013.01); *G06F 9/44568* (2013.01); *G06F 9/45558* (2013.01); *G06F 21/125* (2013.01); *G06F 21/126* (2013.01); *G06F 2009/45587* (2013.01)

(58) Field of Classification Search
  CPC ........ G06F 21/54; G06F 8/434; G06F 21/125; G06F 21/126; G06F 9/45558; G06F 9/44568; G06F 2009/45587
  See application file for complete search history.

(56) References Cited

U.S. PATENT DOCUMENTS

| | | | | |
|---|---|---|---|---|
| 5,590,329 A | * | 12/1996 | Goodnow, II | ...... G06F 11/3624 714/E11.211 |
| 5,845,331 A | * | 12/1998 | Carter | ................... G06F 12/145 711/163 |
| 6,851,108 B1 | * | 2/2005 | Syme | .................. G06F 9/44589 717/118 |
| 8,132,003 B2 | * | 3/2012 | Durham | .................. H04L 9/004 718/1 |
| 8,285,947 B2 | | 10/2012 | Beaumont-Smith et al. | |
| 8,473,754 B2 | * | 6/2013 | Jones | ...................... G06F 21/53 713/171 |
| 8,555,040 B2 | | 10/2013 | Beaumont-Smith et al. | |
| 8,595,707 B2 | * | 11/2013 | Bounimova | ............ G06F 8/434 714/39 |
| 8,631,248 B2 | * | 1/2014 | Cowan | .................... G06F 21/52 711/163 |

(Continued)

*Primary Examiner* — Oleg Korsak
*Assistant Examiner* — Nhan Huu Nguyen
(74) *Attorney, Agent, or Firm* — BAKERHOSTETLER

(57) ABSTRACT

Embodiments described herein provide for virtual machine (VM) based exploit mitigation techniques that can be used to harden web content frameworks and JavaScript Engines. Some embodiments described herein are also generally applicable to other system frameworks, libraries, and program code that executes on a processor that is vulnerable to an attack using a security exploit. Program code that implements the techniques described herein can prevent the use of security exploit attacks to bypass security properties within the program code.

32 Claims, 26 Drawing Sheets

(56) References Cited

U.S. PATENT DOCUMENTS

| | | | |
|---|---|---|---|
| 9,003,384 B2* | 4/2015 | Pizlo | G06F 8/443 |
| | | | 717/136 |
| 9,027,010 B2 | 5/2015 | Barraclough et al. | |
| 9,116,686 B2 | 8/2015 | Gonion | |
| 9,286,085 B2* | 3/2016 | Stoodley | G06F 9/44578 |
| 9,514,305 B2* | 12/2016 | Acar | G06F 21/52 |
| 9,600,663 B2* | 3/2017 | Christodorescu | G06F 21/54 |
| 9,836,291 B1* | 12/2017 | Gschwind | G06F 8/447 |
| 10,162,629 B1* | 12/2018 | Churchill | G06F 8/74 |
| 10,223,295 B2 | 3/2019 | Sell | G06F 12/1441 |
| 10,303,899 B2* | 5/2019 | Durham | G06F 9/45533 |
| 10,360,373 B2* | 7/2019 | Branco | H04L 9/14 |
| 10,489,592 B1* | 11/2019 | Naamneh | G06F 12/1441 |
| 10,579,806 B1* | 3/2020 | Pyo | H04L 9/0891 |
| 2003/0182572 A1* | 9/2003 | Cowan | G06F 21/52 |
| | | | 726/22 |
| 2004/0193814 A1* | 9/2004 | Erickson | G06F 12/1458 |
| | | | 711/156 |
| 2008/0022129 A1* | 1/2008 | Durham | H04L 9/3236 |
| | | | 713/189 |
| 2008/0060077 A1* | 3/2008 | Cowan | G06F 9/4486 |
| | | | 712/E9.083 |
| 2008/0263368 A1* | 10/2008 | Mikami | H04L 63/0464 |
| | | | 713/193 |
| 2011/0161937 A1* | 6/2011 | Bounimova | G06F 11/3608 |
| | | | 717/131 |
| 2013/0145177 A1* | 6/2013 | Cordella | G06F 21/85 |
| | | | 713/193 |
| 2013/0205285 A1* | 8/2013 | Pizlo | G06F 8/443 |
| | | | 717/151 |
| 2014/0020092 A1* | 1/2014 | Davidov | G06F 21/54 |
| | | | 726/22 |
| 2014/0173293 A1* | 6/2014 | Kaplan | G06F 21/54 |
| | | | 713/190 |
| 2015/0186165 A1* | 7/2015 | Levanoni | G06F 8/434 |
| | | | 717/138 |
| 2015/0220731 A1* | 8/2015 | Christodorescu | G06F 21/54 |
| | | | 726/25 |
| 2015/0256556 A1* | 9/2015 | Kaminsky | H04L 63/123 |
| | | | 726/23 |
| 2015/0294113 A1* | 10/2015 | Troeger | G06F 21/53 |
| | | | 726/25 |
| 2015/0331681 A1* | 11/2015 | Rose | G06F 8/437 |
| | | | 717/143 |
| 2015/0378752 A1* | 12/2015 | Stoodley | G06F 9/44578 |
| | | | 717/166 |
| 2016/0092702 A1* | 3/2016 | Durham | G06F 9/34 |
| | | | 713/190 |
| 2016/0110545 A1* | 4/2016 | Acar | G06F 21/52 |
| | | | 726/23 |
| 2016/0171212 A1* | 6/2016 | Majumdar | G06F 9/45558 |
| | | | 713/164 |
| 2016/0179546 A1* | 6/2016 | Yamada | G06F 21/54 |
| | | | 712/240 |
| 2016/0196427 A1* | 7/2016 | Davidov | G06F 21/554 |
| | | | 726/23 |
| 2016/0371199 A1* | 12/2016 | Durham | G06F 21/72 |
| 2017/0126738 A1* | 5/2017 | Wilkerson | G06F 21/52 |
| 2017/0140148 A1* | 5/2017 | Gleeson | G06F 21/57 |
| 2017/0262387 A1* | 9/2017 | Sell | G06F 12/0864 |
| 2017/0285976 A1* | 10/2017 | Durham | G06F 21/64 |
| 2018/0089427 A1* | 3/2018 | Branco | G06F 21/52 |
| 2018/0181748 A1* | 6/2018 | Guillemin | G06F 21/52 |
| 2018/0247082 A1* | 8/2018 | Durham | G06F 8/63 |
| 2019/0034664 A1* | 1/2019 | Barnes | G06F 21/602 |
| 2019/0087566 A1* | 3/2019 | Hosie | G06F 21/44 |
| 2019/0102567 A1* | 4/2019 | Lemay | G06F 21/44 |

\* cited by examiner

```
constexpr unsigned offset = 256;
void leak(unsigned valueToLeak)
{
    (void) b[(valueToLeak & 1) * offset];
}
```

625 → Foo:
    load 20[PC]->int

627 → Bar:
    load 20[PC]->ptr

630 ~ jmp *PC

632 ~
```
load *PC->t, t'
bswap t
xor t, PC
jmp t'
...
xor (bswap address), PC
```

SECURITY CONCEPTS FOR WEB FRAMEWORKS

CROSS-REFERENCE

This application claims priority of U.S. Provisional Patent Application No. 62/653,608, having the title "Security Concepts for Web Frameworks," to Filip J. Pizlo, filed Apr. 6, 2018, which is incorporated by reference in its entirety to the extent that it is consistent with this disclosure.

FIELD

Embodiments described herein relate generally to security concepts to harden program code against malicious attacks and, more specifically, to security concepts to harden web frameworks against attacks against speculative execution hardware.

BACKGROUND OF THE DESCRIPTION

Modern JavaScript engines are required to execute untrusted code very quickly, and for this reason use runtime code generation through mechanisms such as Just-In-Time (JIT) compilation. However, such mechanisms may be leveraged by attackers to bypass operating system or hardware protection. A variety of security issues are relevant to JavaScript engines, as well as computing devices in general, that enable an attacker to gain read access to parts of memory containing secret information. JavaScript engines are particularly impacted because such engines facilitate the execution of untrusted JavaScript code on a user's processor.

SUMMARY OF THE DESCRIPTION

Embodiments described herein provide for virtual machine (VM) based vulnerability mitigation techniques that can be used to harden web content frameworks and JavaScript Engines. Some embodiments described herein are also generally applicable to other system frameworks, libraries, and program code that executes on a processor that is vulnerable to attack due to a variety of potential vulnerabilities. Program code that implements the techniques described herein can prevent the use of attacks to bypass security properties within the program code.

One embodiment provides a data processing system comprising memory to store instructions which, when executed, provides a virtual machine and one or more processors to execute the instructions. The instructions cause the one or more processors to load program code into the virtual machine; identify a pointer within the program code, the pointer having a first value; modify the pointer with a first key value to change the pointer to a second value; and before a dereference of the pointer, apply a second key value to the pointer, wherein the pointer is restored to the first value when the first key value equals the second key value.

A further embodiment includes a data processing system comprising memory to store instructions which, when executed, provides a virtual machine and one or more processors to execute the instructions. The instructions can cause the one or more processors to load program code into the virtual machine; identify a pointer within the program code, the pointer within a data structure that includes a stored type value and a protected value, wherein the program code includes a binary branch to verify the type value before an access to the protected value; set a value at a memory location, the value set equal to output of an XOR operation between the stored type value and a checked type value; and before a dereference of a pointer to the protected value, modify the pointer to the protected value based on the value at the memory location, wherein the value at the memory location is zero when the stored type value and the checked type value are equal.

One embodiment provides for a non-transitory machine-readable medium storing instructions which, when executed by one or more processors, cause the one or more processors to perform operations including loading program code into a dynamic programming language interpreter associated with a virtual machine; detecting an indirect branch where source and destination communicate state information via a register; before the indirect branch, encoding the state information using a first key, the first key based on a destination of the indirect branch; and at the destination of the indirect branch, decoding the state information using a second key, the second key based on a program counter value for the virtual machine.

One embodiment provides for a non-transitory machine-readable medium storing instructions which, when executed by one or more processors, cause the one or more processors to perform operations including loading program code into a dynamic programming language interpreter associated with a virtual machine; interpreting an instruction of the program code; before an indirect branch to a next instruction of the program code, encoding state information associated with the program code using a first key, the first key based on a destination of the indirect branch; and after executing the indirect branch to the next instruction, decoding the state information using a second key, the second key based on a program counter value for the virtual machine.

One embodiment provides for a non-transitory machine-readable medium storing instructions which, when executed by one or more processors, cause the one or more processors to perform operations including creating an allocation cache from which to allocate memory for program code written in a dynamic programming language; determining that a runtime allocation is to be performed for an object of the program code; determining a security origin of the object; and allocating memory for the object from a portion of the allocation cache associated with the security origin of the object, wherein the memory for the object is at least a pre-determined number of bytes away from any object having a different security origin.

One embodiment provides for a non-transitory machine-readable medium storing instructions which, when executed by one or more processors, cause the one or more processors to perform operations including loading first program code written in a dynamic programming language into a virtual machine environment; runtime compiling second program code to generate an interpreter for the first program code; while compiling the second program code, detecting an indirect branch instruction in the second program code, replacing the indirect branch with a direct jump instruction to a first memory location, and writing the indirect branch instruction to the first memory location; and while interpreting the first program code with the interpreter, relocating the indirect branch instruction to a second memory location and patching the direct jump instruction to jump to the second memory location.

One embodiment provides for a non-transitory machine-readable medium storing instructions which, when executed by one or more processors, cause the one or more processors to perform operations including loading compiled instructions of a first program code written in a native programming language; detecting an indirect branch instruction in the first program code; replacing the indirect branch instruction with a load instruction and a jump instruction, the load instruction to load from a first address in memory, the first address controlled by a virtual machine, and the jump instruction to jump to a second address in memory, the second address stored at the first address; writing the indirect branch instruction to the second address in memory; and after a predetermined period of time, relocating the indirect branch instruction to a third address in memory and storing the third address to the first address.

One embodiment provides for a computer-implemented method for compiling a set of program code for execution, the method comprising defining a location in memory to store a spilled register value; spilling a register value of a first variable to the location in memory; determining that the memory location is to be used to store a second variable; and before storing the value of the second variable, setting the memory location to a pre-determined value.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Embodiments described herein provide for virtual machine (VM) based mitigation techniques that can be used to harden web content frameworks and JavaScript Engines. Some embodiments described herein are also generally applicable to other system frameworks, libraries, and program code that executes on a processor that is vulnerable to an attack. Program code that implements the techniques described herein can prevent the use of attacks to bypass security properties within the program code.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments. Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

Processor Overview

Figure 1:
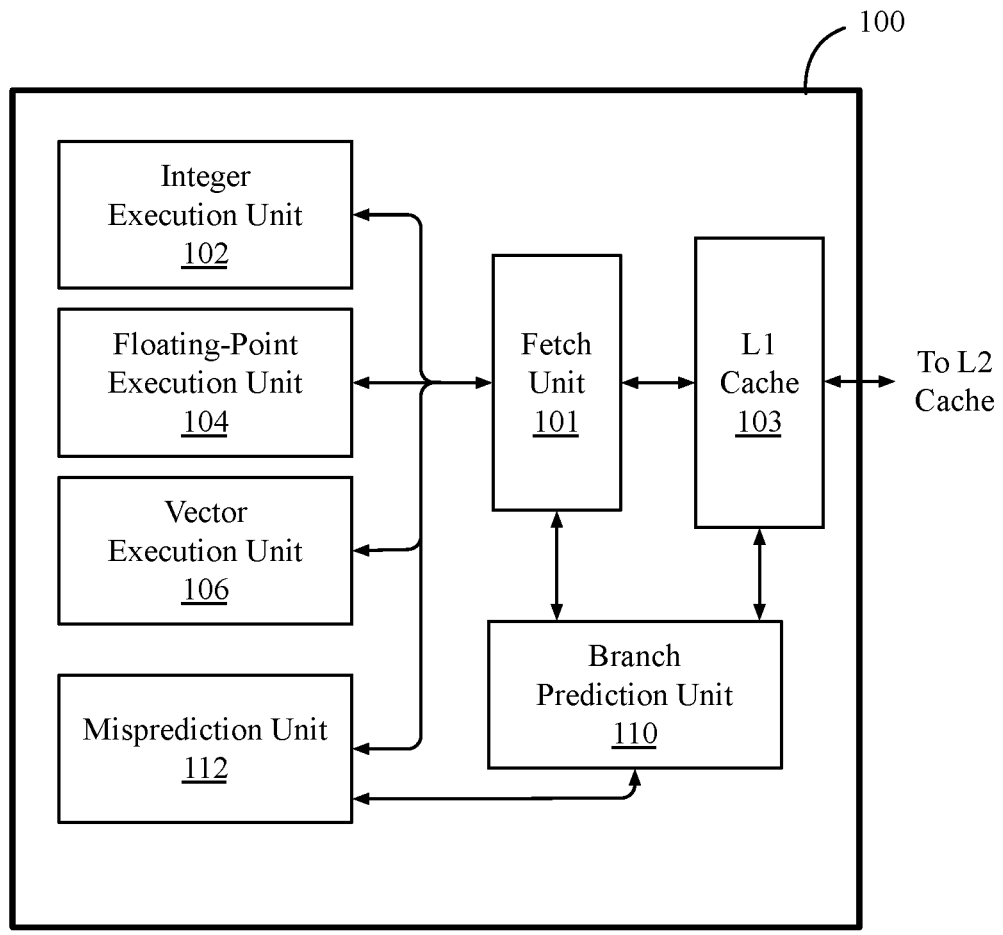
FIG. 1 illustrates a block diagram of hardware logic of a processor, according to embodiments described herein.

FIG. 1 is a block diagram illustrating details of processor 100 having a branch prediction unit 110. The processor 100 includes an L1 cache 103, an instruction fetch unit 101, the branch prediction unit 110, a misprediction unit 112, an integer execution unit 102, a floating-point execution unit 104, and a vector execution unit 106. The integer execution unit 102, floating-point execution unit 104, and vector execution unit 106 as a group may be interchangeably referred to as "the execution units." The execution units can perform computational operations such as logical operations, mathematical operations, or bitwise operations, for example, for an associated type of operand. Although the processor 100 is illustrated having a particular set of components, in various embodiments the processor 100 can include different numbers or types of execution units, functional units, and pipeline stages such as an instruction decode unit, a scheduler or reservation stations, a reorder buffer, a memory management unit, I/O interfaces, and other components that can be coupled to the execution units. Additionally, in various embodiments the illustrated components may be found in different combinations or arrangements than shown, with some components combined with other components into a single module.

In one embodiment, the branch prediction unit 110 can be configured to generate branch target program counter addresses (PCs) for the fetch unit 101 for conditional branch instructions. The branch prediction unit 110 can predict whether a branch will be taken or not taken. Control logic within the branch prediction unit 110 can generate the PC for the fetch unit 101 based on the prediction. Instructions may then be fetched, issued, and executed in a speculative manner dependent upon the predicted outcome of the branch. The branch prediction unit 110 can use any of variety of prediction mechanisms to generate the predictions. For example, branch prediction unit 110 can use local predictors that maintain prediction state (e.g., state machines, tables, counters, or other data structures) for individual branches, global predictors that perform prediction across multiple branches considered in the aggregate, hybrid predictors that combine elements of local and global predictors, or other suitable approaches. In some embodiments, branch prediction unit 110 may employ predictors that dynamically adapt to branch behavior that varies during execution (e.g., to detect and adapt when a branch that was better predicted according to one technique becomes better predicted according to a different technique). In one embodiment, the branch prediction unit 110 includes an indirect branch target predictor to predict target addresses of indirect branch instructions. The indirect branch target predictor can store target addresses generated during previous executions of indirect branches. The stored target addresses can be used as predictions for further indirect branches.

In one embodiment, the misprediction unit 112 is configured to detect when a branch prediction is incorrect, such that the actual behavior of a branch at the time the branch is executed differs from the predicted behavior of the branch. In addition, the misprediction unit 112 can be configured to provide an indication of the misprediction to the execution units, as well as to the branch prediction unit 110. Although the misprediction unit 112 is illustrated as a separate unit, in some embodiments the misprediction unit 112 can be part of the branch prediction unit 110, the fetch unit 101, or any of the execution units. When a processor mispredicts a branch instruction, the pipeline is flushed of the instructions in the mispredicted path, as speculatively-issued instructions should not be allowed to modify the state of the processor in view of the incorrect speculation. However, in many processors, speculative logic may be allowed to perform operations with measurable side effects. Those measurable side effects can be exploited to extract otherwise secret information. Additionally, the speculative execution logic can perform operations that otherwise would not occur during correct program execution. The exploit can be used to cause speculative execution logic within some processors to perform operations that violate the assumptions underpinning numerous software security mechanisms.

Vulnerability Overview

One type of potential vulnerability allows an attacker to cause a victim's processor to enter an execution mode where branches are under the attacker's control. Such attacks may involve a warm-up stage that trains the branch predictor so that every branch in the vulnerable code will be predicted to go in whatever direction the attacker chooses. During the warm-up stage, the attacker can attempt to train security checks to predict that permission should be granted. Such attacks are non-destructive; the attacker can only read information. However, vulnerabilities can be exploited for binary branches and indirect branches.

Figures 2, 3:
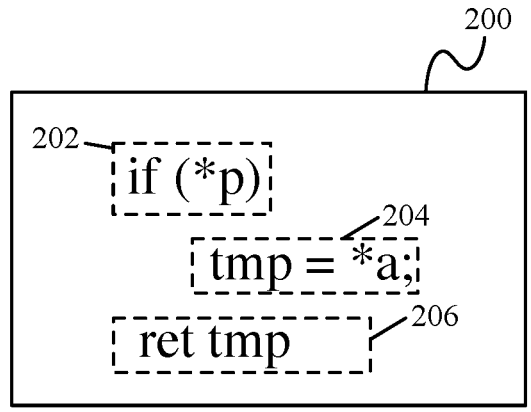
FIG. 2 illustrates a binary branch code sequence.
FIG. 3 illustrates an exemplary information leak gadget.

FIG. 2 illustrates a binary branch code sequence 200. The code sequence 200 uses a branch 202 to protect a load 204. A processor having branch prediction (e.g., processor 100) can execute the load 204 (e.g., tmp=*a) in parallel to the branch 202 (e.g., if (*p)) by predicting the direction of the branch 202 and then executing the load speculatively 204. The branch 202 may be present to check a safety condition, for example, where the load 204 is to load a secret. Accordingly, the branch prediction may cause the processor to execute the load of a secret before the program code flow intends the secret to be loaded. The processor will roll back speculative execution once the processor verifies the correct (e.g., architectural) direction of the branch. However, in spite of roll back logic, branch prediction and speculative execution can still be leveraged to read secret information.

Other exploits may be used to enable the exploitation of indirect branches. Indirect branch instructions can jump to more than two possible target addresses. For example, the return 206 is an indirect branch which branches to an address on the stack. Additionally, an instruction can jump to an address in a register ("jmp eax") or an address in a memory location ("jmp [eax]" or "jmp dword ptr [0x12345678]"). Branch target predictors are used to guess the target of an indirect branch before the input to the indirect branch (e.g., the architectural target) is available. An attack on a specific indirect branch is referred to as a same indirect branch attack. If the indirect branch's destination has some security implications, for example different destinations may make different unguarded assumptions about type, then exploits can be used to exploit the same types of security vulnerabilities as those caused by binary branches. However, a same branch attack will only get a branch to erroneously branch to a destination it has taken before. If all destinations make the same assumptions about security properties, a same branch attack may not be successful.

However, it may be possible to cause an indirect branch to incorrectly branch to the destination to which the branch was trained by the attacker. Predictors can use any function of the branch's program counter, or the address of that branch instruction, as well as historical information to compute a prediction. The use of a function of the branch's program counter may involve lookups in a predictor table. The indirect branch predictors in some processor implementations may only use a subset of the overall address to index into the predictor table. As an optimization, those tables do not detect collisions, which means that an indirect branch could be made to branch to a target trained by a different branch. If an attacker can discern what subset of bits are used, the attacker can use this information to create interference due to aliasing. For example, a predictor may use the low eight bits of the PC of the branch to perform a lookup in a hash table that contains a 16-bit target offset. The offset describes the branch target as a delta from the program counter of the branch. Accordingly, an attacker can cause an indirect branch to speculatively jump to any 16-bit offset from itself, which may even point to the insides of instructions, by causing some other branch to jump to that offset if that branch shares the same eight low bits in its program counter. Thus, an aliased indirect branch attack can make a branch jump to a target that the programmer did not intended to be accessible from the branch. The attacker can then cause the processor to jump to a program code in memory that is referred to as a 'gadget,' which performs some desired function of the attacker that can create a side channel based on sensitive data available to the victim.

An additional vulnerability can allow stale data within a register stack to be read by an attacker. For example, when a register is spilled to a register stack as part of program register allocation management, an attacker can cause the processor to erroneously read an older value from the spilled register slot. For example, the processor may attempt to speculatively fill from a register stack location that supposedly stores a pointer value and instead read a stale integer value instead. If the attacker has control over the integer value, the attacker may trick the processor into accessing that integer value as a pointer value, which may allow the attacker to read from an arbitrary memory location.

FIG. 3 illustrates an exemplary information leak gadget 300. The information leak gadget 300 includes a constant offset 302 that is large enough to span a cache line and a leak function 304 that perform a read from an array 306. The gadget can leak information by performing a memory access the array 306 using a bit from valueToLeak 305 as an index, where valueToLeak 305 is a parameter of the function. The processor is designed to perform a fetch from main memory into the L1 cache of the processor while executing speculatively. However, the processor may not roll back the speculative fetches when other operations are rolled back. Therefore, invoking leak 304 during an attack leaks one bit of information that can be recovered by later timing loads on the array 306. For example, loads at b[0] and b[offset] can be performed and a comparison can be performed to determine which load was faster.

Some vulnerability-based attacks are a race between the branch verifier and the information-leaking load. Branch verification can be held up for any number of reasons, depending on the processor. It can be assumed that attackers may be able to find a way to delay the branch verification, possibly by inserting expensive-to-verify branches before the branch the attacker is attempting to exploit. Attackers can detect if the race has been won by checking if the loads from b[0] and b[offset] take sufficiently different amounts of time. The attacker can retry the attack if the race fails. Therefore, a successful information leak simply relies on the attacker having a non-zero chance of winning the race. The most common technique for slowing down branch verification is to make the branch verification depend on something that was flushed to main memory. For example, in branch code sequence 200 of FIG. 2, the attacker would flush *p of the branch 202.

Vulnerability Mitigations

Described herein are various techniques to mitigate a system's vulnerability to attacks. In one embodiment, pointer poisoning is applied to harden against binary and indirect branch-based type checks. In one embodiment, object distancing is applied to prevent attacks that are used to bypass bounds checking. In one embodiment, random jumping is employed as a JIT-based mitigation that makes branch prediction difficult to control.

Pointer Poisoning

One embodiment provides for a pointer poisoning technique that can be used to harden type checks. Security exploits can be used to implement type-confusion attacks on some programs where a data structure of one type of intentionally confused with a data structure of a different type. Type-confusion vulnerabilities may particularly be present when type-casting is in use in program code or for program code written in a loosely typed programming language. In such program code, binary or indirect branch type checks may be used to perform different logic operations based on the runtime type of an object or other data structure. Some security vulnerabilities enable an attacker to bypass the type check, making type confusion attacks easier.

Pointer poisoning techniques described herein can be used to harden program code against binary and indirect branch-based type checks. As described herein, poisoning means adding, subtracting, or XORing some other value (e.g., key) into the pointer to create a pointer to a virtual memory address that is not mapped to an actual physical memory address. Unpoisoning means subtracting, adding, or XORing out the poison key to recover the original pointer. Techniques for choosing poison keys that create unmapped pointers can vary based on operating system or processor architecture. For example, in the macOS or iOS operating systems provided by Apple Inc. of Cupertino, California, adding 1<<40 to any valid pointer is extremely likely result in a pointer to garbage data. In one embodiment, at least 8 bits of an address that can be used to store a poison key in such a way that real pointers will not have the poison key bits set to anything other than 0 or some other well-known value. Furthermore, unpoisoning with the wrong key will result in an unmapped pointer. Thus, a pointer poisoning can only be used as the intended pointer type. Attempting to type confuse the pointer will result in an invalid address.

For example, consider a data structure as shown in Code Sequence 1 below.

| Code Sequence 1 - Example Data Structure |
|---|
| 01 struct Foo { <br> 02   int type; <br> 03   void* data; <br> 04 }; <br> 05 if (foo->type == 42) <br> 06   tmp = ((Thingy*) foo->data)->secret; |

In the data structure of Code Sequence 1, accesses to data first perform a type check to determine which type to which the data pointer should be cast. Pointer poisoning can be used to protect this data structure from attacks against the type check by poisoning the data pointer with a different key depending on the type. In one embodiment, one poison key per object type is used. For example, if a given class has five pointers, each pointing to different types of secrets, five poison keys can be used for that class. Additionally, in one embodiment, the poison keys are specific to a class, and the poison keys used for a class are not used for any other class. In such embodiment, poison keys are thus unique for each class and for each data type within each class.

For example, an exemplary shift "<<40" can be used to create poison keys. Using the example of Code Sequence 1, the poison key would be 42<<40. Thus, new code would be as shown in Code Sequence 2.

| Code Sequence 2 - Example Poisoned Data Structure |
|---|
| 01 struct Foo { <br> 02   int type; <br> 03   uintptr_t data; <br> 04 }; <br> 05 if (foo->type == 42) <br> 06   tmp = ((Thingy*) (foo->data ^ (42 << 40)))->secret; |

Pointer poisoning is sound as long as the bits for the poison key are not bits that vary in a user-controllable way in legitimate mapped addresses. In one embodiment, sound pointer poisoning can be performed using the top 16 bits in a 64-bit pointer on processors, which can work on processors supporting the Intel (e.g., x86) Instruction Set Architecture (ISA) as well as the ARM64 ISA. However, one embodiment provides a JavaScript engine having support for pointer tagging, in which the high 16-bits of a pointer address are used. In such embodiment, a poisoned pointer that has a path for being confused with a JavaScript value avoids setting the high 16-bits when poisoning. Pointer poisoning techniques of such embodiment can also avoid poisoning any other bits used by the pointer tagging scheme (e.g., the bottom 2-bits of the pointer, in some implementations).

In one embodiment, bits of a pointer that will be poisoned are poisoned using values provided by a random-number generator at program start, with a different random number generated for each type key. The type keys can be stored as a read-only static global value. Pointers can then be poisoned and unpoisoned by XORing the pointer with the appropriate type key. When selecting a register to load poison values in JIT compiled code, it is optimal to select a register that will be immediately clobbered or to otherwise zero the poison value in the register after use to reduce the chance of the poison value being leaked.

Universal Pointer Poisoning

Pointer poisoning helps when applied to any pointer. However, pointer poisoning can be most effective when protecting a pointer that must be dereferenced on the same path that has a vulnerable type check. One embodiment provides a universal formula for making a type check safe by moving the data that the type check protects out-of-line and pointing to the data with a poisoned pointer. For example, given an exemplary class Foo that is part of a type hierarchy that does dynamic type checks and downcasts. The specifics of the dynamic type checking scheme are not relevant, any scheme can be used.

Figure 4:
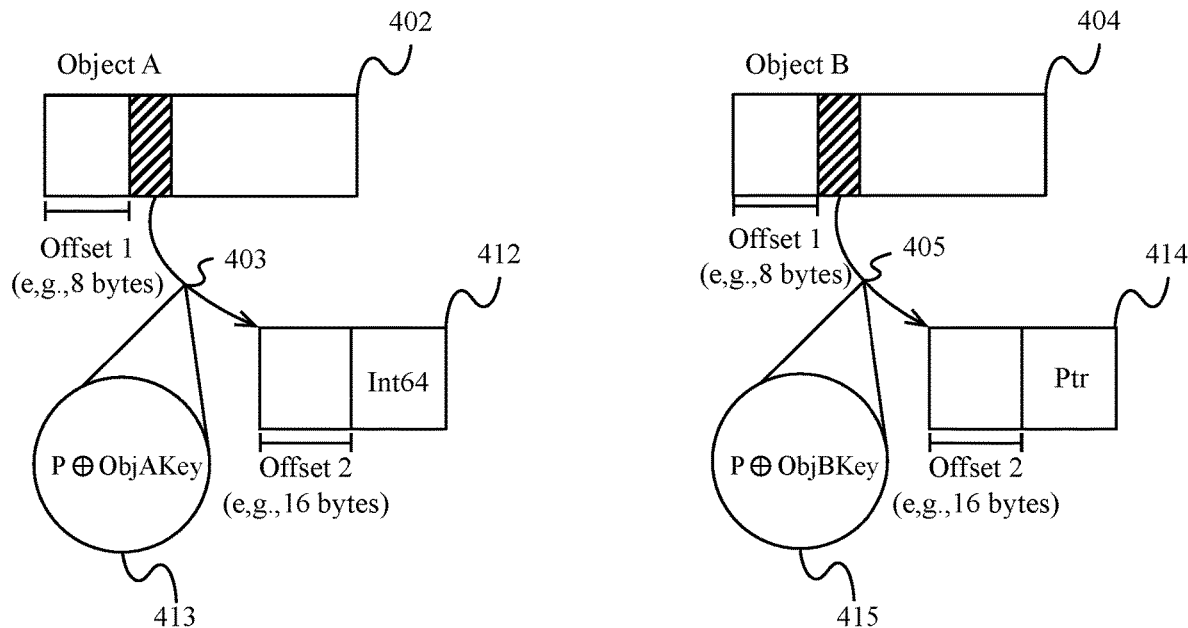
FIG. 4 illustrates a universal pointer poisoning technique, according to an embodiment.

FIG. 4 illustrates a universal pointer poisoning technique 400, according to an embodiment. Universal pointer poisoning is designed to harden code against type confusion attacks in general, and particularly against type confusion attacks that can be triggered via one or more security vulnerabilities. Consider an object in memory (Object A 402) that which stores a pointer 403 at an offset (Offset 1) from the beginning of the object. The pointer can point to an address including some data 412. The data 412, at some offset (e.g., Offset 2) can store a 64-bit integer data type. A second object in memory (Object B 404) may also have a pointer 405 at the same offset (Offset 1), where that pointer 405 pointers to data 414 in which a pointer is stored at an offset (Offset 2). Where the pointer of data 414 and the integer of data 412 are at the same offset, an attacker can use an API call, or some other technique, to store an attacker-controlled integer value in data 412 and type confuse data 412 with data 414, in an attempt to have the victim's processor dereference the integer value as a pointer. Embodiments described herein can employ a pointer poisoning technique that poisons the pointers 403, 405 to the implementations of the objects 402, 405. The pointers are poisoned using object (and type) specific keys (e.g., Pointer XOR ObjAKey 413, Pointer XOR ObjBKey 415). While an XOR operation is illustrated as the poisoning operation, other reversible mathematical operations (e.g., addition/subtraction) can be used.

Pointer poisoning can be performed, for example using smart pointers. In one embodiment, a poisoned class template is provided with built-in operations to create poisoned pointers and to poison the poisoned pointers. Different poisoned pointers can have different keys. Key diversity is controlled by a parameter to the Poisoned<> smart pointer. For example, Poisoned<POISON(Key), Type> bases the poison key on Key. The poisoning will randomize all bits except the low 3 and the high 16 to stay out of the way of other tagging schemes and to ensure that type confusion does not lead to misalignment.

Code Sequence 3 shows an example class before mitigation via the universal poisoning formula.

Code Sequence 3 - Example Class Before Mitigation

```
01  class Foo : public Base {
02  public:
03  ...
04  private:
05      int m_x;
```

Code Sequence 3 - Example Class Before Mitigation -continued

```
06      Bar* m_y;
07  };
```

The class of Code Sequence 3 can be mitigated as shown in Code Sequence 4 below.

Code Sequence 4 - Example Mitigated Class

```
01  class Foo : public Base {
02  public:
03  ...
04  private:
05      struct Data {
06          int x;
07          Bar* y;
08      };
09      Poisoned<POISON(Foo), Data*> m_data;
10  };
```

The example mitigated class of Code Sequence 4 hardens type checks by moving state information for the class into a data structure pointed to by a poisoned pointer. All fields are moved into the structure regardless of the data type of the field. In one embodiment, the illustrated mitigation is implemented universally, where all classes of the type hierarchy place state inside structures that are pointed to by pointers with unique poison keys. The universal pointer poisoning formula illustrated in Code Sequence 4 improves upon related class implementation patterns, such as the pointer-to-implementation pattern, which may still be vulnerable to type-confusion attacks. For example, a class structured using pointer-to-implementation may still be vulnerable to an attack to read beyond the bounds of an object.

In one embodiment, the universal pointer poisoning formula can also be used to poison classes that are C-style variable length objects, as shown in Code Sequence 5.

Code Sequence 5 - Example Mitigated Variable Length Class

```
01  class Bar {
02  public:
03  ...
04  private:
05      struct VLength {
06          size_t entries;
07          int data [0];
08          // VLength is allocated as
09          // malloc(sizeof(VLength) + sizeof(data[0]) * entries)
10      };
11      Poisoned<POISON(Bar), VLength*> m_data;
12  };
```

Dynamic Poisoning

Some objects may not suitable for mitigation via universal pointer poisoning because those objects store the type and data payload for the object in the same slab, block, or region of memory. Dynamic poisoning is an extension of pointer poisoning that can be applied to those types of object.

Figure 5:
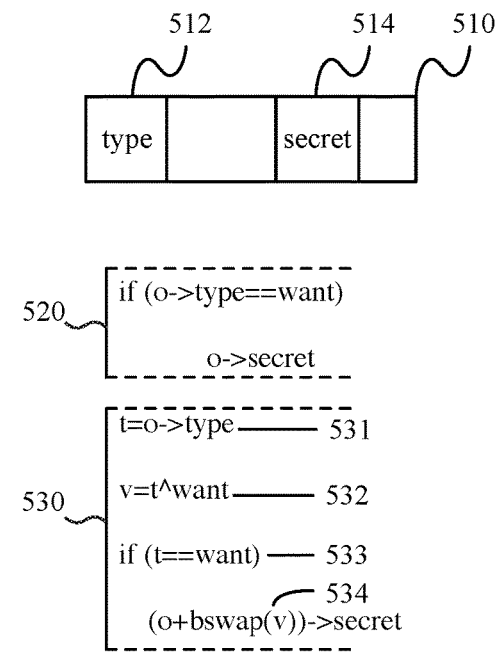
FIG. 5 illustrates dynamic pointer poisoning on an object, according to an embodiment.

FIG. 5 illustrates dynamic pointer poisoning 500 on an object, according to an embodiment. In one embodiment, an object 510 including a type 512 and a secret 514 can be stored in memory of a computing device. The type 512 stores the data type for the object and the secret 514 can be any protected data payload for the object.

Code block 520 illustrates program code that performs a binary type check to determine whether the secret is to be accessed. Before the secret is accessed, a binary check is performed to determine if the type of the object is correct. This code block is vulnerable to one or more security exploits, as the attacker can cause the victim's processor to speculatively access o→secret.

Code block 530 illustrates dynamic pointer poisoning to protect the access to the secret. Code block 530 illustrates one exemplary form of dynamic pointer poisoning, and other techniques can also be applied. In one embodiment, security vulnerabilities can be mitigated by dynamically poisoning the pointer to the secret value. Dynamic poisoning can be performed by a set of operations that include operation 531 to assign the type 512 to a temporary variable and performing operation 532 to XOR the temporary variable with the desired type. If the current type 512 of the object is equal to the desired type (e.g., want), the result of operation 542 will be zero, while the result will be non-zero if the type 512 differs from the desired type. The pointer to the secret can then be dynamically poisoned 534 by adding the result of operation to the base address of the object during the access to the secret. In one embodiment, a byte swap (e.g., bswap) instruction, or an equivalent function, can be used to swap the byte order of the result of operation 532 when the access to the secret is dynamically poisoned 534. The byte swap can be used to ensure the address delta applied by the dynamic poisoning operation will cause a malicious access to resolve to an invalid or unmapped memory address if type check at operation 533 is bypassed.

Additional methods and techniques of dynamic poisoning can also be applied to code. An additional block of vulnerable code is shown in Code Sequence 6.

Code Sequence 6 - Example Vulnerable Class

```
01 struct Tricky {
02    int type;
03    int secret; // Only OK to access if type = 42
04 };
05 if (tricky->type == 42)
06    tmp = tricky->secret;
```

Dynamic pointer poisoning can be applied for the object of Code Sequence 6 to result in the converted into the code shown in Code Sequence 7.

Code Sequence 7 - Dynamically Poisoned Type Check

```
01 int delta = tricky->type - 42;
02 if (!delta)
03    tmp = tricky[delta << 40].secret;
```

As show in Code Sequence 7, in one embodiment dynamic pointer poisoning scheme can be used to turn any equality-based type check into a hardened type check by threading the result of the comparison into the pointer's high bits. If the type is not the appropriate type value (e.g., 42) then the tricky pointer will be offset into unmapped memory by delta <<40. To enable dynamic poisoning as shown, a technique should be implemented to conceal from the compiler that the delta value is provably zero inside the if (!delta) statement on line 02 of Code Sequence 7, otherwise the compiler may attempt to optimize away the check. In one embodiment, an opaque block of code can be created to block compiler analysis. For example, in some intermediate representations, such as in the bare bones backend (B3) intermediate representation, an Opaque opcode description can be used. Other languages and representations include similar functionality to conceal the value of delta. For example, an opaque( ) function can be defined that functions as an identity but is opaque to the compiler. Branching can be performed using a code statement such as "if (!opaque (delta))," to prevent the compiler from optimizing out the mitigation.

Live State Poisoning

Poisoning can also be used as a mitigation for indirect branches. Indirect branches are vulnerable because an attacker can use a pair of indirect branches to jump to any address of their choosing. Consider an indirect branch whose various targets make different assumptions about object type. This indirect branch can be protected against same-indirect-branch and at least a subset of aliased-indirect-branch attacks by putting all live state in an object that is pointed-to by a poisoned pointer, where the poison key is a function of the jump destination. The jump target would then unpack the live state from that object.

Live state poisoning can be used to mitigate vulnerabilities within an interpreter for interpreted languages, such as within a JavaScript interpreter within a JavaScript engine. As interpreters may have a large number of user-controlled indirect branches, interpreters may be particularly vulnerable to attacks on indirect branches.

Figures 6A, 6B, 6C:
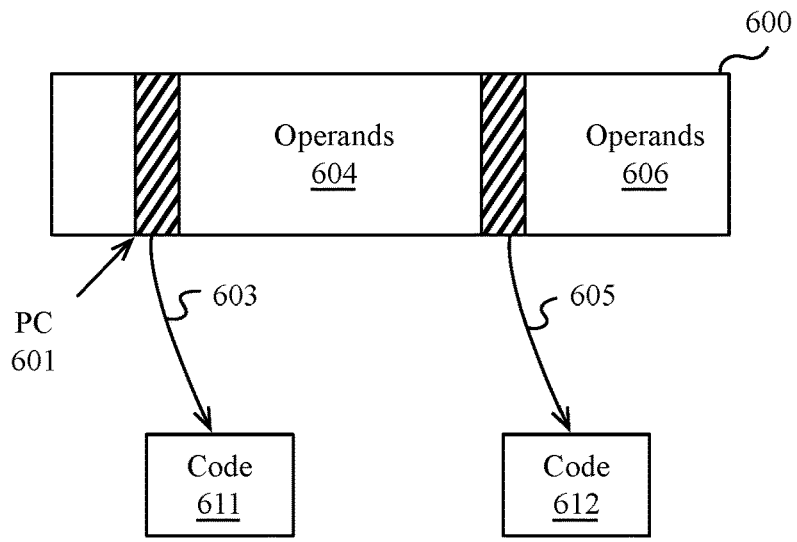
FIGS. 6A-6C illustrate live state poisoning for indirect branches, according to embodiments described herein.

FIGS. 6A-6C illustrate live state poisoning for indirect branches, according to embodiments described herein. FIG. 6A illustrates memory associated with an interpreter. FIG. 6B illustrates instructions that can be used in a security vulnerability attack. FIG. 6C illustrates live state poisoning to mitigate an indirect branch security vulnerability.

As shown in FIG. 6A, memory 600 associated with an interpreter can include pointers 603, 605 to machine code to service opcodes of an interpreted language. Operands 604 for interpreted instructions can be placed in the memory 600 after the pointers 603, 605. To handle an opcode, the interpreter can load a pointer 603, 605 to machine code designed to handle a given opcode and jump to the machine code 611, 612 using a jump instruction. After handling an opcode, the interpreter can load the next pointer from a computed offset of the current program counter (PC 601) and jump to that address to handle the next opcode.

As shown in FIG. 6B, an attacker can supply an instruction 625 (Foo) that loads a value from an offset of the program counter and uses that instruction as an integer. The interpreter routinely performs instructions that, for example, load from the same offset from the program counter and use that value as a pointer. An attacker can train the interpreter and speculative execution logic to expect to execute instruction 627, then the attacker can substitute instruction 625. The speculative execution logic, having been trained to expect instruction 627, will load instruction 625 and potentially load an arbitrary integer as a jump target, allowing potentially arbitrary code to be executed, at least until the speculative rollback occurs. The attacker can then use any measurable side effects from the speculatively executed code to leak protected information.

Instruction 630 of FIG. 6C is an indirect jump to a program counter that is vulnerable to one or more exploits. Instruction 630 is similar to the type of instruction that would occur at the end of every interpreter dispatch. One embodiment provides a live state poisoning technique that mitigates such vulnerability. Instruction 630 can be replaced with code block 632. At code block 632, the value of *PC is loaded into temporary registers t and t'. A byte swap (bswap) operation can optionally be performed on the address in temporary register t, and XOR operation can be performed between the value of register t and the program counter. The original jump address (the program counter address) stored in register t' can then be used as the target of the jump instruction. The operations of code block 632 are used to poison the program counter before the jump. At the destination of the jump (e.g., at the beginning of each interpreter instruction), the instruction can XOR the current byte swapped address with PC. If the current address does not match the intended address, the program counter will not be correctly unscrambled, and execution of the interpreted program will not be able to continue. However, if the jump arrives at the correct address, the program counter will be unscrambled into a valid address.

Live state poisoning can also be used to protect data in registers that are live across an indirect jump, such that the registers contain data that will be used on the other end of the jump. The live registers (e.g., live state) can be packed into in an object that is pointed-to by a poisoned pointer, where the poison key is a function of the jump destination. The state will be successfully unscrambled only if the jump destination is the intended jump destination. For example, consider an indirect jump (jmp *%r12) where %rsp, %rbp, and %rdx are live. The target of such jump may then begin using the state in a way that makes assumptions about data types. Example vulnerable code is shown in Code Sequence 6 below.

Code Sequence 6 - Example Vulnerable Code

```
01 movq -42(%rbp), %rcx
02 movl 37(%rcx), %rax // assume that 37 is a meaningful offset
   for -42(%rbp)
03 addl 13(%rdx), %rax // assume that 13 is a meaningful offset for
   %rdx
```

Code Sequence 6 is susceptible to attack if other jump destinations of jmp *%r12 make different assumptions about the shape of what -42(%rbp) and %rdx point to. It would be desirable to prevent those loads from happening until it can be verified that the indirect jump arrived at the correct destination.

With live state poisoning, the jump site would first pack the live state inside a stack-allocated object, as shown in Code Sequence 7.

Code Sequence 7 - Live State Poisoning

```
01 movq %rsp, -104(%rpb)
02 movq %rbp, -96(%rbp)
03 movq %rdx, -88(%rbp)
04 leaq -104(%rbp), %r11 // use %r11 as the live state pointer
05 movq %r12, %rax
06 bswap %rax
07 xorq %rax, %r11 // poison the state with the jump destination
08 jmp *%r12
```

The jump destination can then decontaminate the live state and continue execution, as in Code Sequence 8.

Code Sequence 8 - Live State Decontamination

```
01 movq 0xkey, %rax // 0xkey is the bswapped PC of this instruction
02 xorq %rax, %r12
03 movq (%r12), %rsp
04 movq 16(%r12), %rdx
05 movq -42(%rbp), %rcx
```

Code Sequence 8 - Live State Decontamination

```
06 movl 37(%rcx), %rax // assume that 37 is a meaningful offset for
   -42(%rbp)
07 addl 13(%rdx), %rax // assume that 13 is a meaningful offset for
   13(%rdx)
```

In Code Sequence 8, should the jump arrive at the incorrect address due to an exploit, the live state information will decode incorrectly, as the key is based on the intended destination of the jump.

Object Distancing

Some type checks protect reads from memory just past the end of an object. Such type check can be done without mitigations if it can be guaranteed that whatever is past the end of the object is not secret and cannot be profitably type-confused. For example, imagine some objects that are never accessed past offset 128, regardless of type. If those objects can have any size that is a multiple of 8, accesses at offsets 8 to 120 could potentially access some other object. Furthermore, such objects can be used to contain tagged values with a tagging scheme that is hardened against attack. Additionally, the object can belong to a security origin, such that is can be assumed that if an object can legitimately access an object in a security origin, then the object can legitimately access other objects in the same security origin. Thus, any checks used to protect reading past the end of such objects could be hardened by ensuring objects from different security origins are spaced apart by at least 128 bytes in memory. Additionally, one embodiment provides program logic to ensured that the 128 bytes after any given object do not contain an object that stores values that can be type-confused with tagged values contained within the objects provided by the hardened framework described herein. 128 bytes is used as an example. In various embodiments, object distancing can be used to ensure that certain objects are placed at an offset of at least K bytes from objects of a different security origin.

Object distancing can be used to ensure that the K bytes after any given object does not contain values that could be type-confused with the tagged values contained within objects associated with a JavaScript Engine or another web content framework. In one embodiment, this technique is implemented by allocating all such objects in a common space and inserting a K-byte guard at the end of that space. Object distancing as described herein can be applied to protect type checks that are performed so frequently as to make other mitigations impractical.

Dynamically-typed object-oriented languages frequently make use of polymorphic inline caches (PICs) to improve the efficiency of compiler generated code. However, the use of PICs significantly increases the vulnerability of code to attack due to the frequent use of binary branches in such codes. This vulnerability leaves PIC generated code vulnerable to attacks that can be used, for example, to speculatively read an out of bounds address. Due to the difficulty of applying mitigations to code generated using PICs, object distancing can be applied to mitigate the severity of an attack on such code.

In one embodiment, a security origin is analogous to a site origin or a security kind. A site origin refers to the source of an object. Object distancing can distance objects by site origin to that objects originating from one website are distanced from objects from another website. Site/security origin distancing can be used, for example, to prevent an attack that originates from one website to access data associated with a different website. In the context of a JavaScript engine, the security kind of an object refers to whether the object can be directly pointed-to by JavaScript values, thus can perform loads of JavaScript values at offsets within the range [0, K) from the object base. In general, a security origin as described herein can refer to any origin or base address from which objects of the same security scope (e.g., site origin, security kind, etc.) will be allocated, such that objects in the same security scope have similar security properties, including similar vulnerabilities to exploits. Objects allocated within a given security origin will be distanced in memory from objects of a different security origin by at least K bytes.

Figure 7:
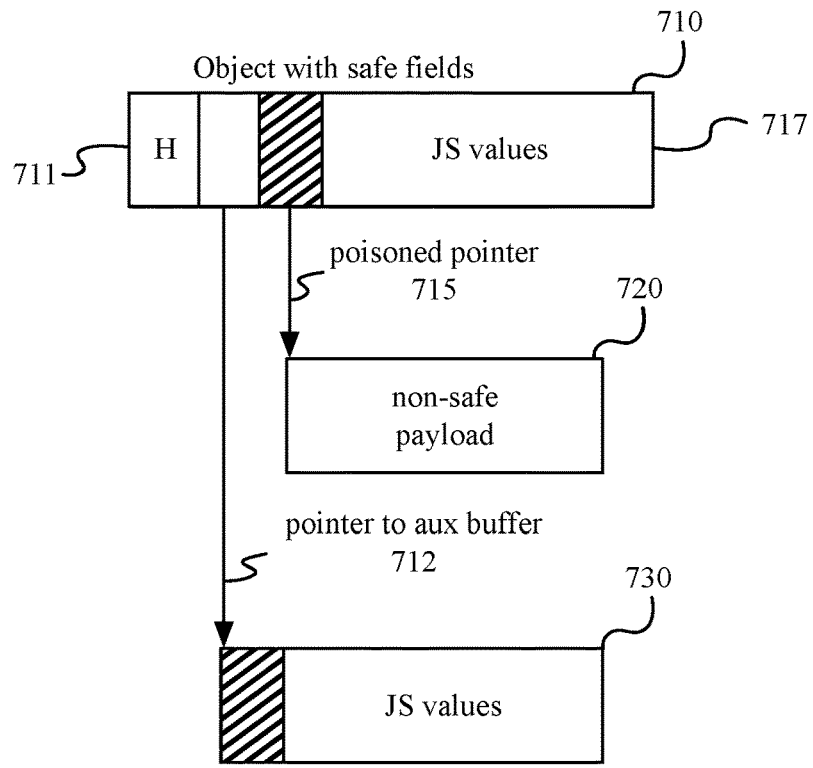
FIG. 7 illustrates an exemplary safe object model, according to an embodiment described herein.

FIG. 7 illustrates an exemplary exploit safe object model 700, according to an embodiment described herein. The illustrated object model 700 contains fields that are safe to access as if those fields were JavaScript values, in the sense that speculative execution logic cannot fruitfully exploit such values. Object distancing can also be used to distance objects that store JavaScript values and objects that store unboxed integers or unpoisoned pointers. A JavaScript value originates from a JavaScript context that represents the JavaScript execution environment containing that value.

An object 710 within the object model 700 includes safe fields including a header field 711, a pointer to an auxiliary buffer 712, a poisoned pointer 715, and a set of JavaScript values. The header field 711 contains non-secret meta-data that is formatted in such a way that the field will not look like a pointer even if under user control, and any type proofs derived by reading from it are separately mitigated against using poisoning and distancing. The pointer to an auxiliary buffer is a pointer to a buffer that contains JavaScript values or poisoned pointers. Any non-safe payloads 720 are protected by a poisoned pointer 715.

The illustrated object model 700 can use object distancing to further mitigate attacks by configuring objects such that any access past the end of an object, up to a pre-determined offset, will only be able to access another similarly formatted object from the same security origin. Object distancing can be implemented, for example, in a JavaScript engine to distance objects from different site origins. In one embodiment, object distancing by site origin can be performed using allocation based on security origin. In such embodiment, each security origin has a separate allocator, with a cache of free memory from which the allocator can service allocation requests. For example, each allocator can have a separate free list associated with a per-allocator block of memory. Memory blocks are associated with a specific security origin. An allocator for a security origin, when searching for a new block from which to allocate, can be configured to avoid any partially empty blocks that belong to a different origin.

In one embodiment, a multi-threaded garbage collector for a JavaScript Engine can be configured to adapt thread level caching to perform object distancing based on security origin. In a JavaScript Engine, the garbage collector is responsible for both allocating and de-allocating memory. Multi-threaded garbage collectors can use thread local caches to enable multiple threads to perform memory allocations without requiring explicit synchronization during fast-path operation. In one embodiment, thread local caching is adapted to perform security aware allocation to ensure that objects of different origins are spaced appropriately. A pointer to the TLCs can be stored in a global object, and an object can be made aware of the TLC to which the object is associated. When performing a garbage collection action on the object, a pointer to the TLC associated with the object can be retrieved. In one embodiment, the TLC for each thread can be stored in thread-local storage for each thread. In one embodiment, a multi-threaded garbage collector is enabled, with each security origin associated with a separate thread. In one embodiment, multiple security origins can be handled by a single thread, with a separate TLC associated with each security scope. In such embodiment, the garbage collector can context switch between allocators associated with the multiple TLCs of the thread, even though the multiple TLCs may be associated with the same thread.

Figure 8:
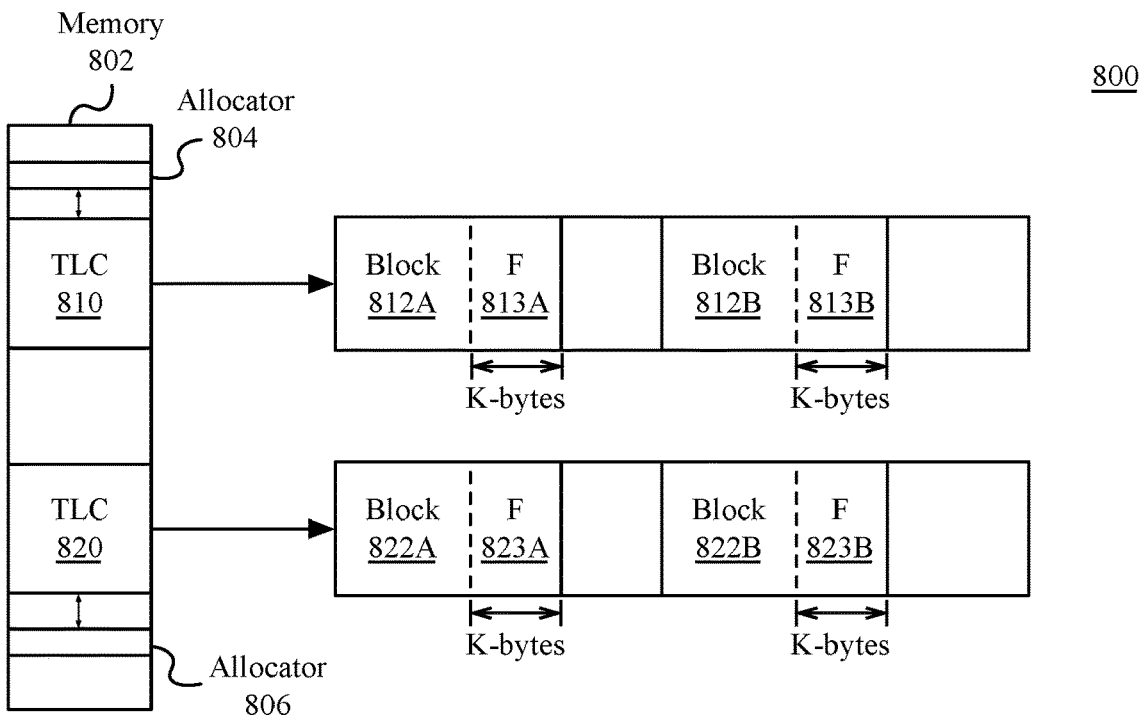
FIG. 8 illustrates based object distancing using thread-local caches, according to an embodiment.

FIG. 8 illustrates TLC based object distancing 800, according to an embodiment. In one embodiment, an electronic device includes memory 802, which can be virtual memory managed by an operating system of the electronic device. Multiple thread level caches (TLC 810, TLC 820) can be stored in memory. In one embodiment, TLC based object distancing 800 is implemented in a garbage collector for a JavaScript Engine. Each TLC 810, 820 can be associated with a separate allocator 804, 806 of the garbage collector. In one embodiment, each TLC 810, 820 and/or each allocator 804, 806 is associated with a separate security scope. For example, allocator 804 can allocate blocks (e.g., block 812A-812B) from TLC 810 for a first security scope, while allocator 806 can allocate blocks (e.g., block 822A-822B) for a second security scope. Memory for objects of a security scope can then be allocated from a block associated with that security scope.

In one embodiment, each block contains a footer field (F 813A-813B, F 823A-823B) at the end of each block. The footers contain metadata would otherwise be stored in a block header and that cannot be used in an exploit. Each footer field is at least K-bytes wide. In such embodiment, security scope-based object distancing can be performed on a per-block basis, as objects allocated in a first block (e.g., block 812A) would be guaranteed to be spaced at least K bytes away from an object in a second block (e.g., block 812B) which may be of a different security scope.

Random Jumping

JavaScript Engines make extensive use of indirect branches. Accordingly, the most optimal indirect branch mitigations would still allow branch prediction to work most of the time. One embodiment implements random jumping is a JIT-specific mitigation that allows continued operation of branch prediction for the majority of the engine's operation while making that branch prediction difficult to control. To handle indirect jumps performed by an interpreter, the low-level interpreter for the JavaScript Engine can be transformed into a JIT-generated interpreter. One embodiment implements random jumping for ahead-of-time compiled code by using indirect branches at the original call site, while randomizing the target of those indirect jumps.

Random jumping can be used to mitigate against aliased indirect branch attacks. Some security vulnerabilities be used to enable branch target injection which causes an indirect branch to speculatively execute a 'gadget' which creates a side channel based on sensitive data available to the victim.

Figure 9:
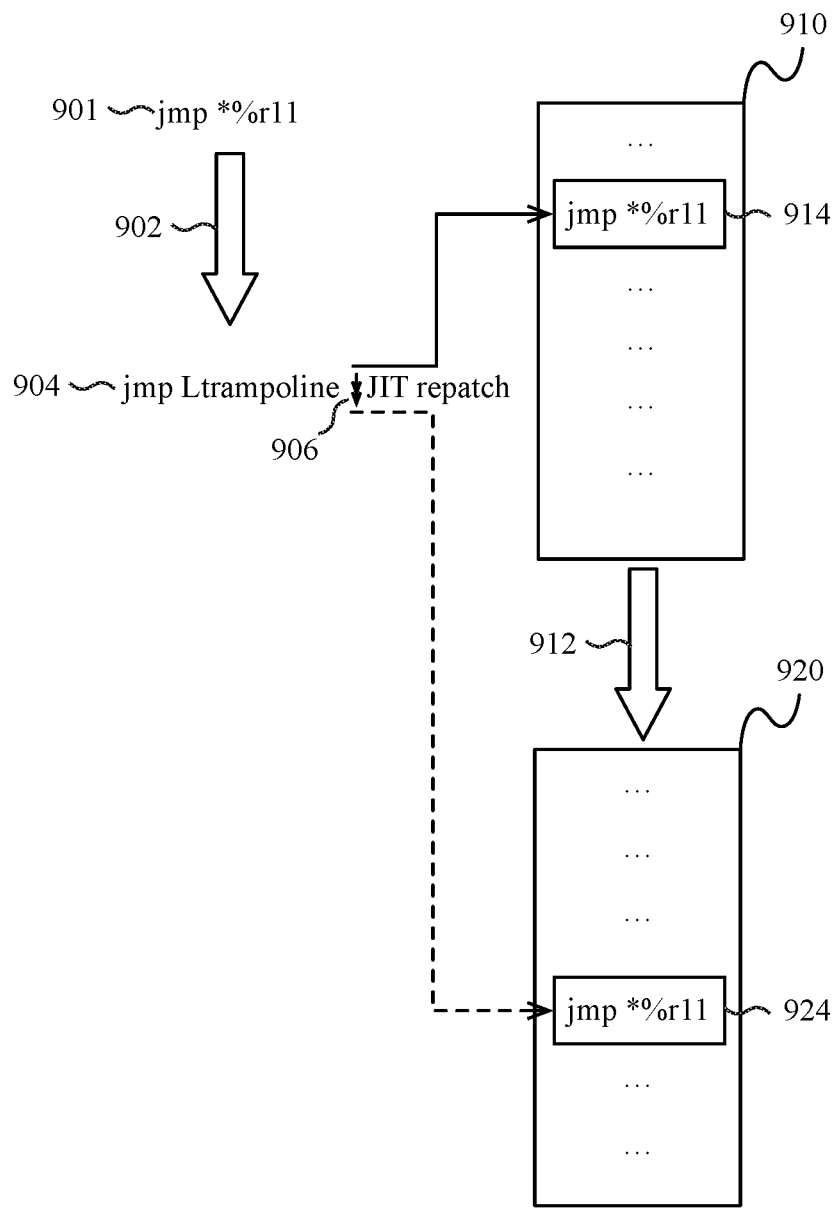
FIG. 9 illustrates a random jumping technique, according to an embodiment.

FIG. 9 illustrates a random jumping technique 900, according to an embodiment. In one embodiment random jumping is implemented such that that every indirect branch 901 (e.g., jmp *%r11) is replaced 902 with a direct jump 904 to the same indirect branch, but at a random location 914 in memory 910. The memory 910 can be a set of addresses in a randomly allocated slab of memory that is dedicated to storing the jump addresses of indirect branches from the original code. In one embodiment the randomization scheme focuses on randomizing the low bits of the PC of the indirect branches, as those bits contribute the most to the hash function used by the branch target predictor of many processors. A JavaScript virtual machine can allocate the memory 910 as page-size slab in which indirect branches are bump-allocated. In one embodiment, every millisecond the virtual machine can evacuate 912 all still-live indirect branches to a new memory slab 920 in random order and re-patches 906 the direct jump 904 to the new slab 920. Even if the new slab 920 is allocated using the normal executable allocator, such that the allocation lands at a deterministic location, the fact that the jumps are relocated in random order within the new slab 920 makes it difficult for an attacker to guess the layout of indirect branches well enough to mount an attack. Even if the attacker probed to try to find out the layout, the layout would change before the attacker made any progress. Furthermore, each time the memory location of the indirect branch changes, the manner in which that address is aliased in the branch predictor also changes.

In an alternate embodiment, random jumping can be implemented by pre-allocating a single slab of memory and only randomly re-write the original branches without modifying the slab. In this implementation, some slab entries may be used by the same original branch for short time periods resulting in reduced randomness of the branch destination. In one embodiment, random jumping is used for calls. The original indirect call is replaced with a direct call to a trampoline in memory that does an indirect branch using the operands of the original indirect call. The return address of both the processor return stack and the actual stack points to the instruction after where the original indirect call would have been located.

A random jumping refresh rate of one millisecond is likely to prevent an attacker from gaining any useful information about jumps before the jumps are randomly reshuffled. During the window between refreshes, random jumping does not prevent branch prediction from accelerating indirect branches. Random jumping is effective because the warm-up time of the branch predictor is much shorter than the warm-up time of an information leak, so branch prediction acceleration can be effective for at least a portion of the runtime operation. Random jumping can be used for all JIT-based indirect branches, as opposed to other mitigations, such as the retpoline mitigation, as random jumping is effective on a wide variety of hardware and does not disable branch prediction.

Figure 10:
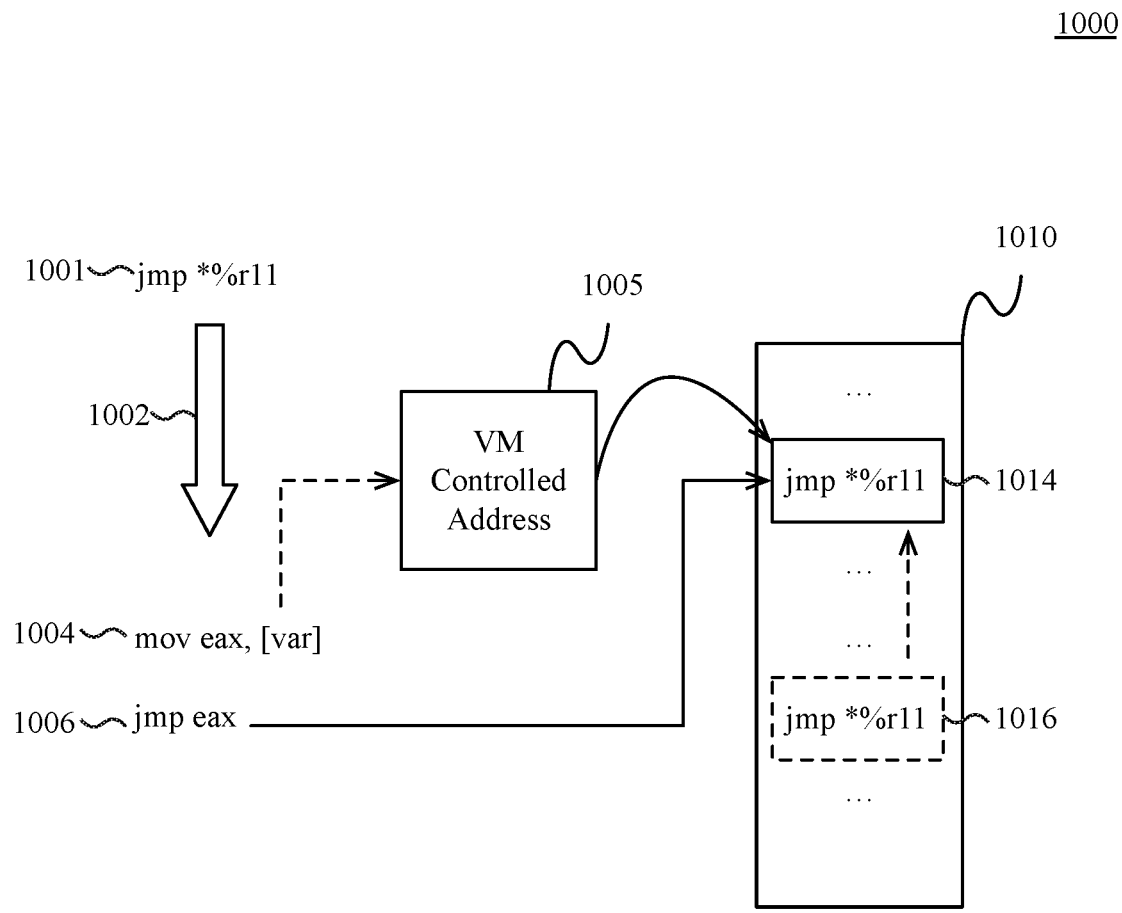
FIG. 10 illustrates random jumping technique for ahead-of-time compilers, according to an embodiment.

FIG. 10 illustrates random jumping technique 1000 for ahead-of-time compilers, according to an embodiment. The random jumping technique 900 of FIG. 9 is a JIT-based technique that re-patches code at runtime. One embodiment provides the random jumping technique 1000, which works for native ahead-of-time compiled code, which cannot be re-patched at runtime. Native program code is program code that is written and compiled for a specific platform or processor, as opposed to interpreted or dynamic code that executes within a virtual machine environment. The ahead of time random jumping technique 1000 replaces the indirect branch 1001 at the original call site while randomizing the destination of those indirect jumps. Each original indirect branch 1001 is replaced 1002 with a load 1004 (e.g., move from memory) from a global variable 1005 that contains an address controlled by the JavaScript virtual machine. The load 1004 is followed by a jump 1006 to the address contained in that global variable 1005. The global variable points to a slab 1010 in memory that contains indirect branches with entries that include jumps to the destination of the original indirect branch 1001, in a similar manner as the slabs of indirect branches in FIG. 9.

In one embodiment the global variable 1005 is updated periodically to point to a different slab entry chosen at random. For example, the global variable 1005 can initially point to a first slab location 1016. The associated entry can be moved randomly to a different slab location 1014 and the address in the global variable 1005 can be updated accordingly. In one embodiment, a JavaScript engine implementation can reduce aliasing by associating one global variable per original indirect call and configuring the random updates to ensure that no two global variables ever point to the same slab entry. This approach also allows the branch predictor to warm up, while the random updates prevent an attacker from gathering enough information to perform an information leak.

In all random jumping approaches suggested above, one implementation can use a dedicated thread to perform updates periodically, followed by micro-sleep. Alternatively, an implementation could instead schedule signal delivery to an existing thread when a timer expires and perform updates from the signal handler. A system with frequent enough periodic tasks such as garbage collection or event loops could use these frequent tasks as the update mechanism.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of the another set of APIs.

Figure 11:
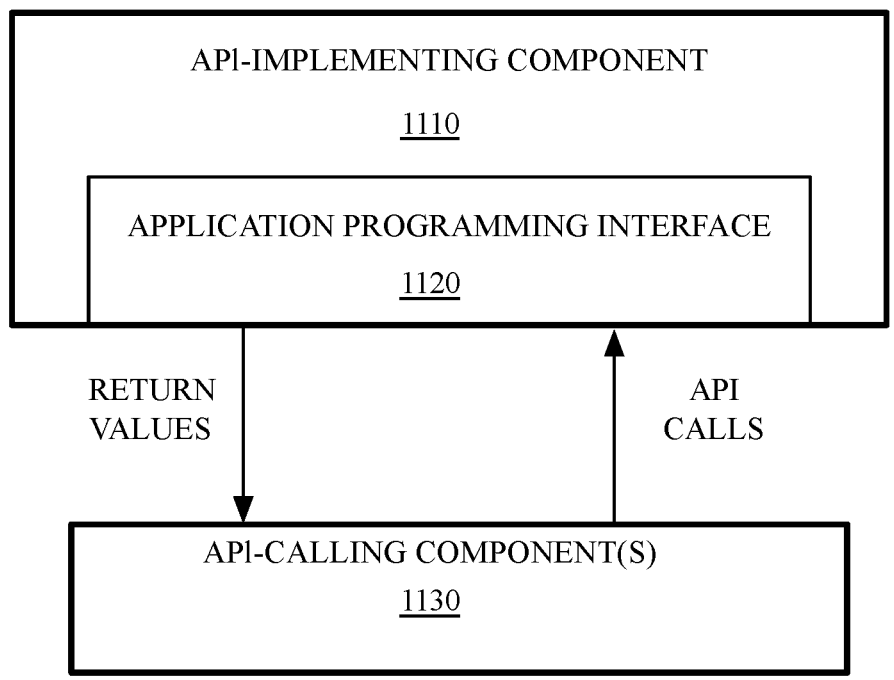
FIG. 11 is a block diagram illustrating an exemplary API architecture, which can be used in some embodiments.

FIG. 11 is a block diagram illustrating an exemplary API architecture, which can be used in some embodiments. As shown in FIG. 11, the API architecture 1100 includes the API-implementing component 1110 (e.g., an operating system, a library, a device driver, an API, an application program, software, or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software, or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 11 illustrates one instance of the API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 12A:
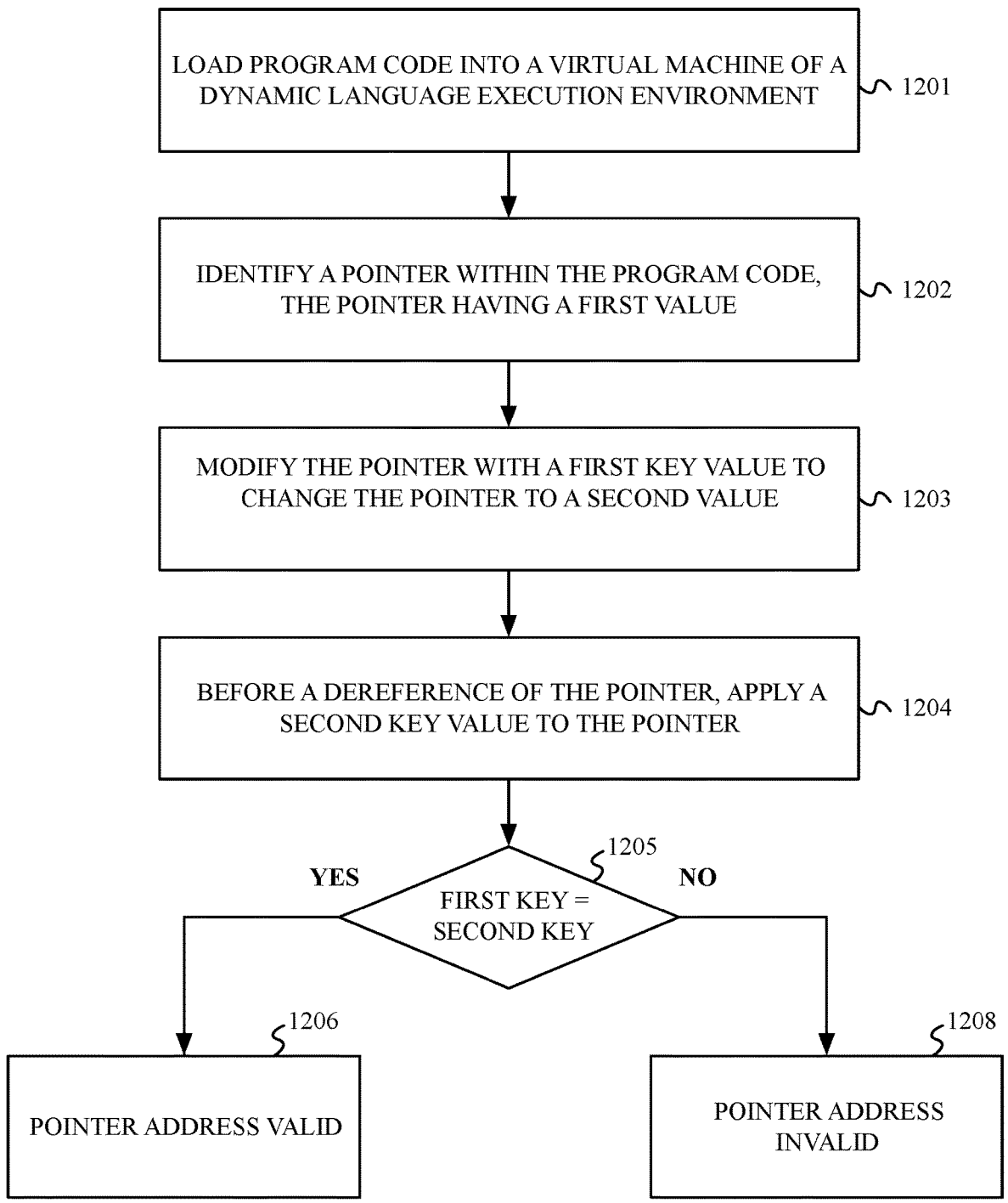
FIGS. 12A-12D are flow diagrams of methods of pointer poisoning, according to embodiments described herein.
Figure 12B:
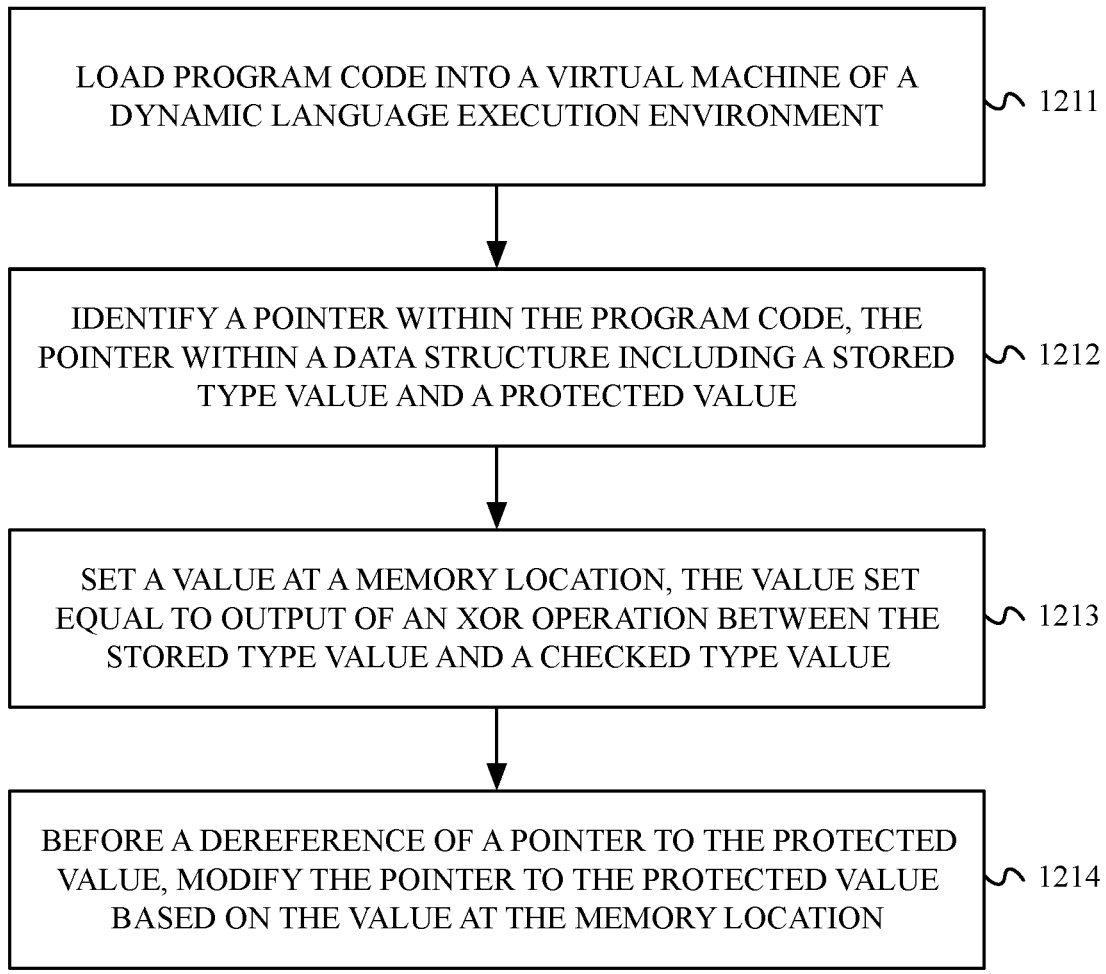
Figure 12C:
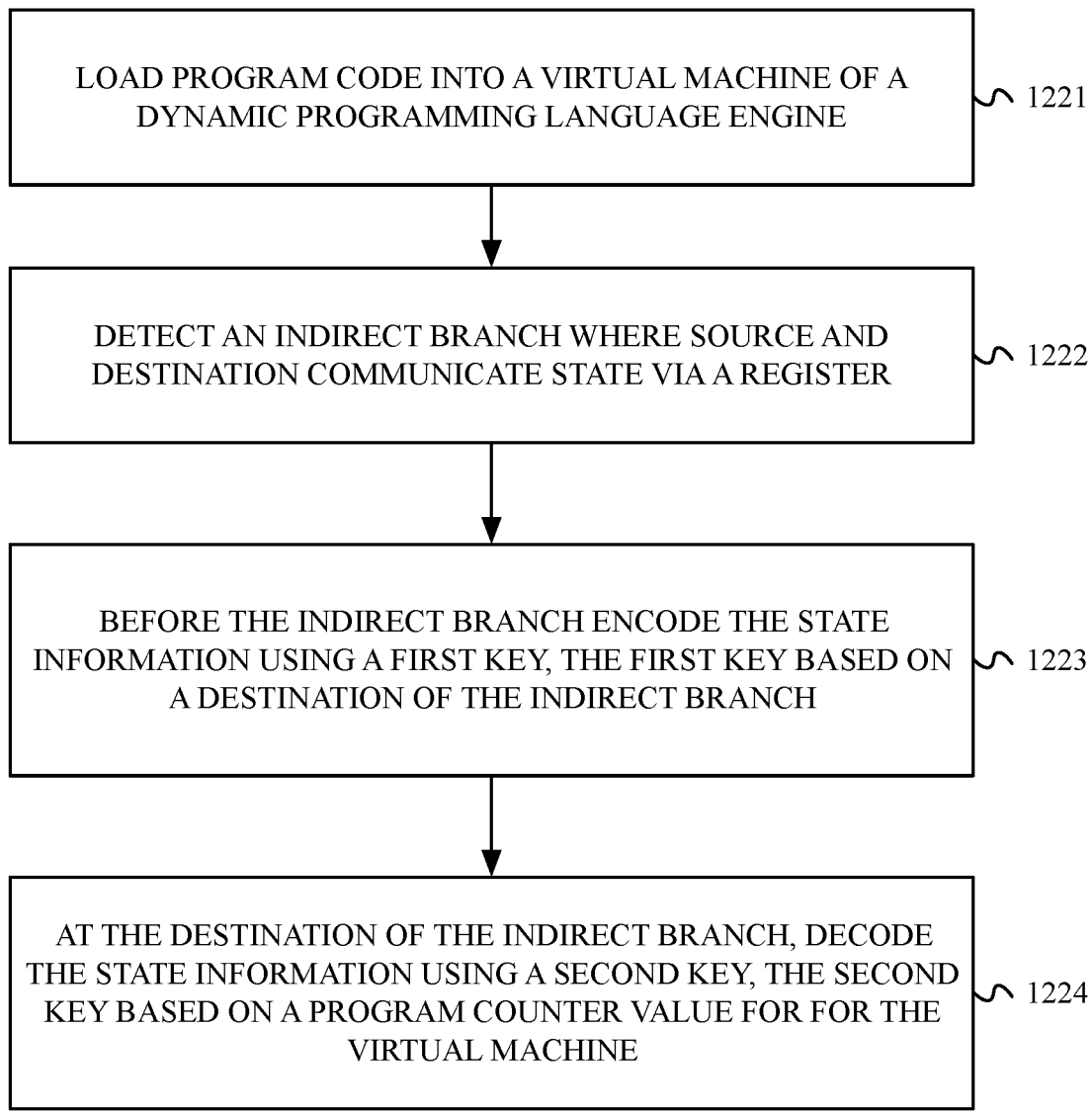
Figure 12D:
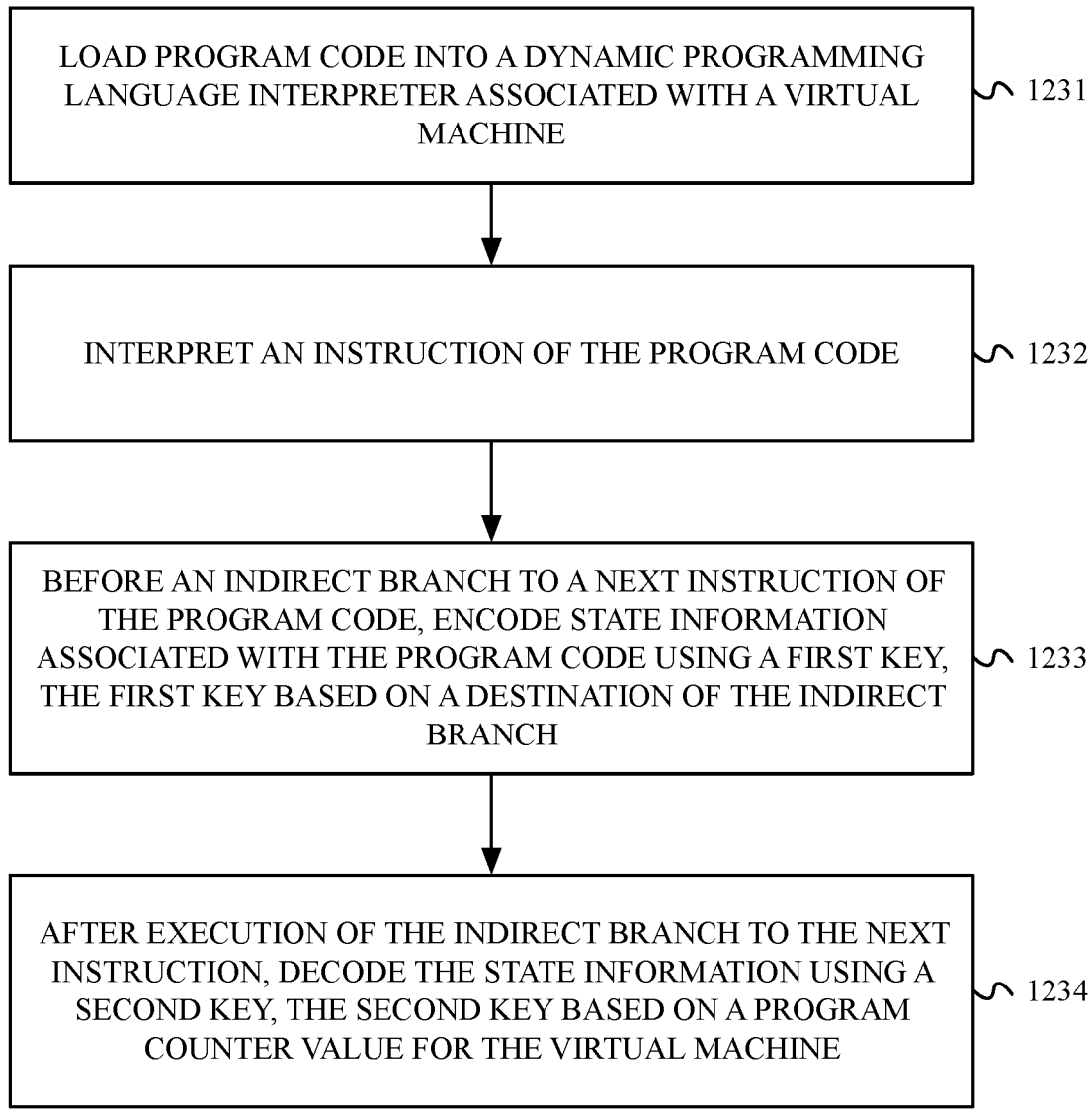

FIGS. 12A-12D are flow diagrams of methods of pointer poisoning, according to embodiments described herein. FIG. 12A illustrates a method 1200 of universal pointer poisoning. FIG. 12B illustrates a method 1210 of dynamic pointer poisoning. FIGS. 12C-12D illustrate methods 1220, 1230 of live state poisoning.

The method 1200 of FIG. 12A includes to load program code into a virtual machine of a dynamic language execution environment, as shown at block 1201. The method 1200 additionally includes to identify a pointer within the program code at block 1202. The identified pointer can have a first value that identifies the address of a protected value. The method additionally includes to modify the pointer with a first key value to change the pointer to a second value, as shown at block 1203. The method additionally includes to apply a second key value to the pointer before a dereference of the pointer, as shown at block 1204. If, as shown at block 1205, the first key is equal to the second key, meaning that the pointer is being dereferenced as the correct type, the pointer address will be valid, as shown at block 1206. Otherwise the pointer address will be invalid, as shown at block 1208.

The method 1210 of FIG. 12B includes to load program code into a virtual machine of a dynamic language execution environment, as shown at block 1211. The method 1210 additionally includes to identify a pointer within the program code, as shown at block 1212. The pointer within a data structure can include a stored type value and a protected value. The protected value can be protected by instructions that perform a type check on the stored type before allowing access to the protected value. As shown at block 1213, the method 1210 additionally includes to set a value at a memory location equal to output of an XOR operation between the stored type value and a checked type value. In one embodiment, the memory location can be a location within system memory or within a register (e.g., register file) of a processor. The method 1210 additionally includes, before a dereference of a pointer to the protected value, modify the pointer to the protected value based on the value at the memory location, as shown at block 1214.

The method 1220 of FIG. 12C is a generalized method of live state poisoning for indirect branches. The method 1220 can be applied at any point during compilation or interpreting of program code that includes an indirect branch where the source and destination of the indirect branch transmit state information across the branch via registers. Method 1220 includes to load program code into a dynamic programming language interpreter associated with a virtual machine, as shown at block 1221. The method 1220 can additionally include to interpret an instruction of the program code, as shown at block 1222. As shown at block 1223, the method 1220 further includes to encode state information associated with the program code using a first key before an indirect branch to a next instruction of the program code. The first key is based on a destination of the indirect branch. The method 1220 additionally includes, after execution of the indirect branch to the next instruction, to decode the state information using a second key, as shown at block 1224. The second key can be based on a program counter value for the virtual machine. If the indirect branch is caused to speculatively branch to a different location, the state information will not be successfully decoded.

The method 1230 of FIG. 12D is a live state poisoning method that is specific to dynamic programming language interpreter associated with a virtual machine. The method 1230 includes to load program code into a dynamic programming language interpreter associated with a virtual machine, as shown at block 1231. The method 1230 can additionally include to interpret an instruction of the program code, as shown at block 1232. As shown at block 1233, the method 1230 further includes to encode state information associated with the program code using a first key before an indirect branch to a next instruction of the program code. The first key is based on a destination of the indirect branch. The method 1230 additionally includes, after execution of the indirect branch to the next instruction, to decode the state information using a second key, as shown at block 1234. The second key can be based on a program counter value for the virtual machine. The program counter value specifies an address within a virtual machine-controlled address space that is associated with the next instruction to be executed, which should correspond with the intended destination of the indirect branch. If the indirect branch is caused to speculatively branch to a different location, the state information will not be successfully decoded.

Figure 13A:
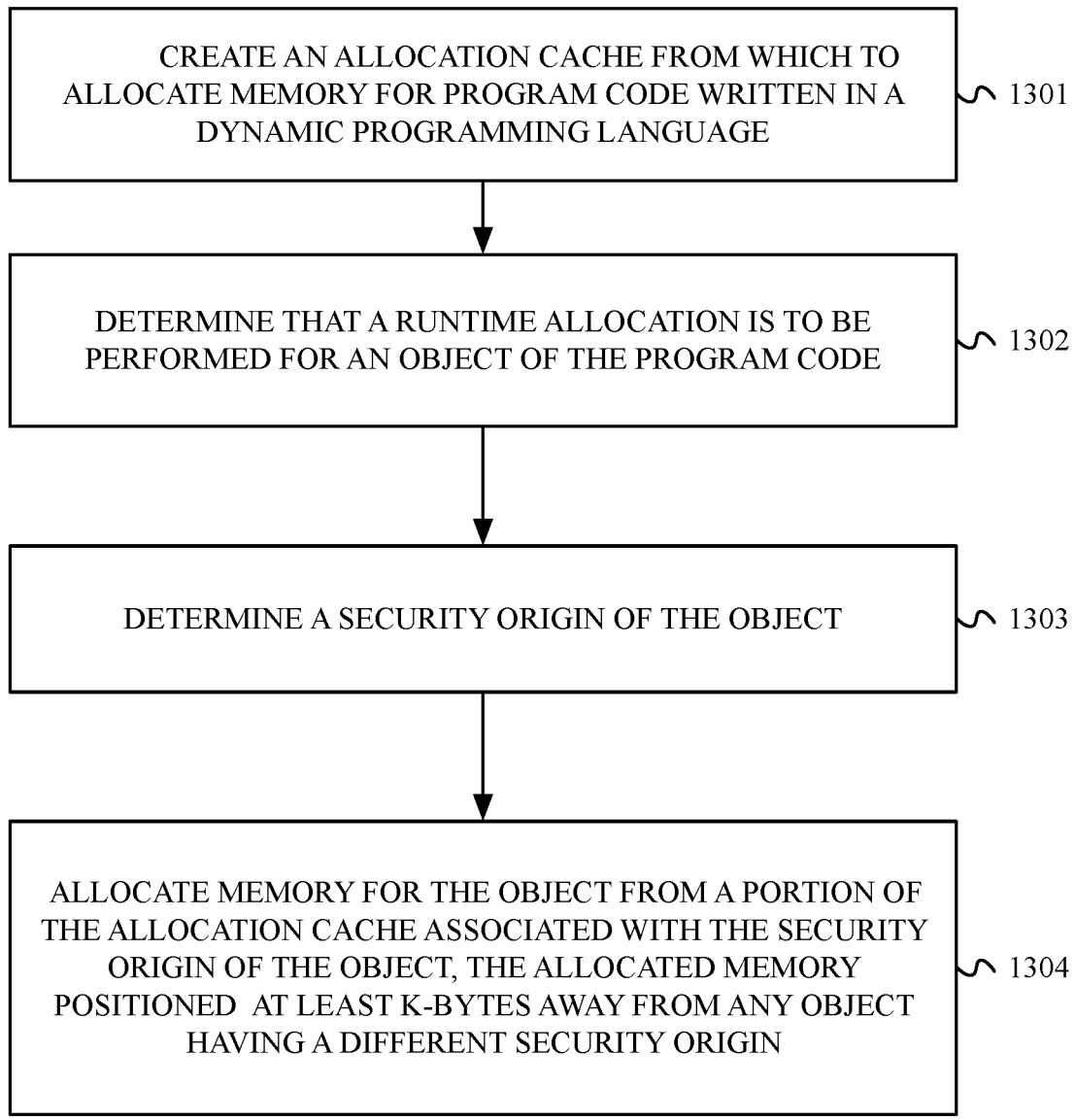
FIGS. 13A-13B are flow diagrams of methods of object distancing, according to embodiments described herein.
Figure 13B:
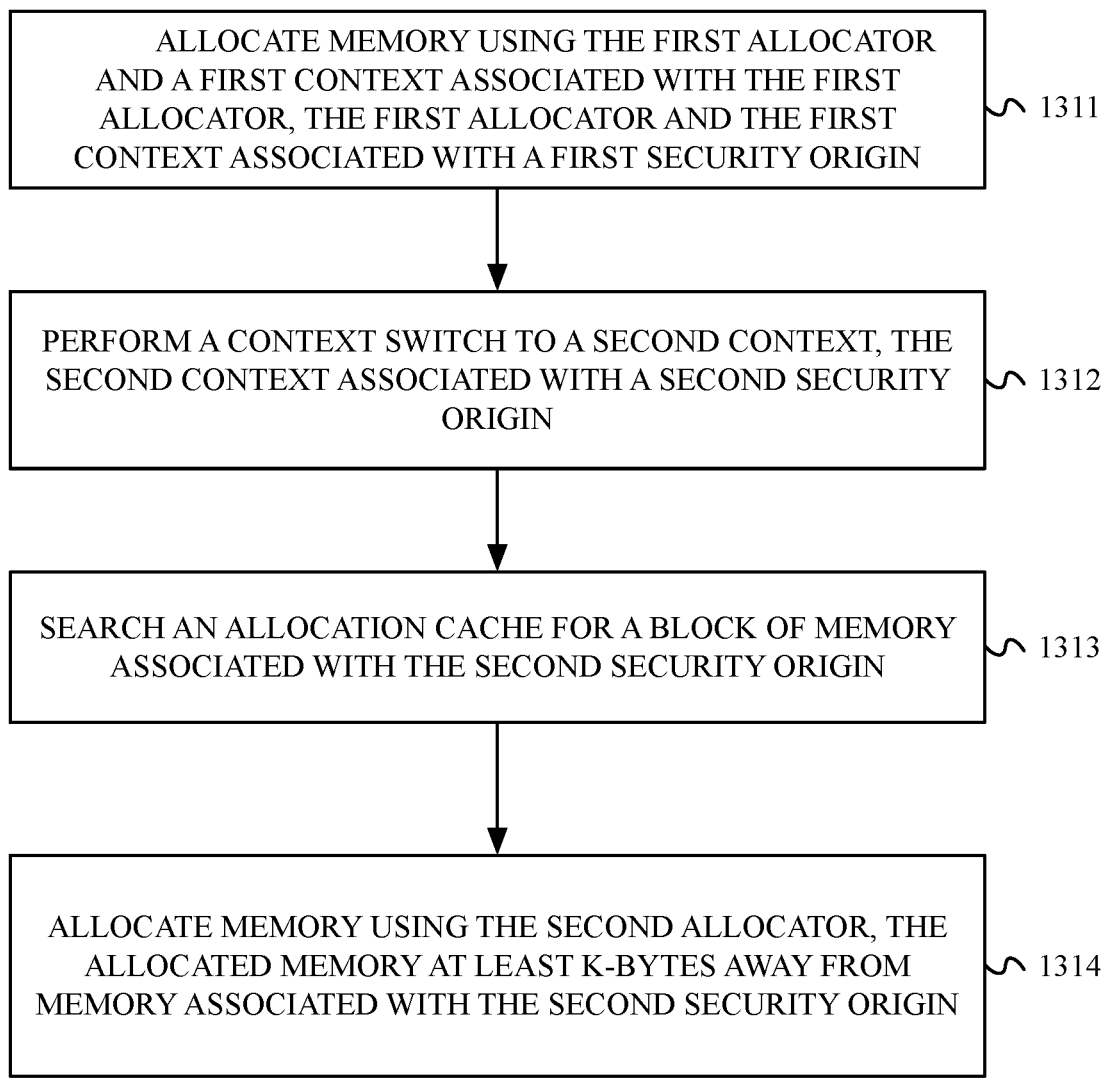

FIGS. 13A-13B are flow diagrams of methods of object distancing, according to an embodiment. FIG. 13A illustrates a method 1300 of object distancing during memory allocation. FIG. 13B illustrates of method 1310 of allocating memory for multiple security origins using multiple allocators.

The method 1300 of FIG. 13A includes to create an allocation cache from which to allocate memory for program code written in a dynamic programming language, as shown at block 1301. The dynamic programming language can be, for example, the JavaScript programming language. The method 1300 additionally includes to determine that a runtime allocation is to be performed for an object of the program code, as shown at block 1302. The method 1300 additionally includes to determine a security origin of the object, as shown at block 1303. The method 1300 additionally includes to allocate memory for the object from a portion of the allocation cache associated with the security origin of the object, the allocated memory positioned at least K-bytes away from any object having a different security origin, as shown at block 1304. The value K can be a pre-determined value used to distance objects in memory of differing security origins, where a security origin is related to one or more of a site origin or a security type.

The method 1310 of FIG. 13B includes to allocate memory using the first allocator and a first context associated with the first allocator, the first allocator and the first context associated with a first security origin, as shown at block 1311. The method 1310 additionally includes to perform a context switch to a second context, the second context associated with a second security origin, as shown at block 1312. The method 1310 can additionally search an allocation cache for a block of memory associated with the second security origin, as shown at block 1313. The method 1310 can further allocate memory using the second allocator, the allocated memory at least k-bytes away from memory associated with the second security origin, as shown at block 1314. The value K can be a pre-determined value used to distance objects in memory of differing security origins, where a security origin is related to one or more of a site origin or a security type.

Figure 14A:
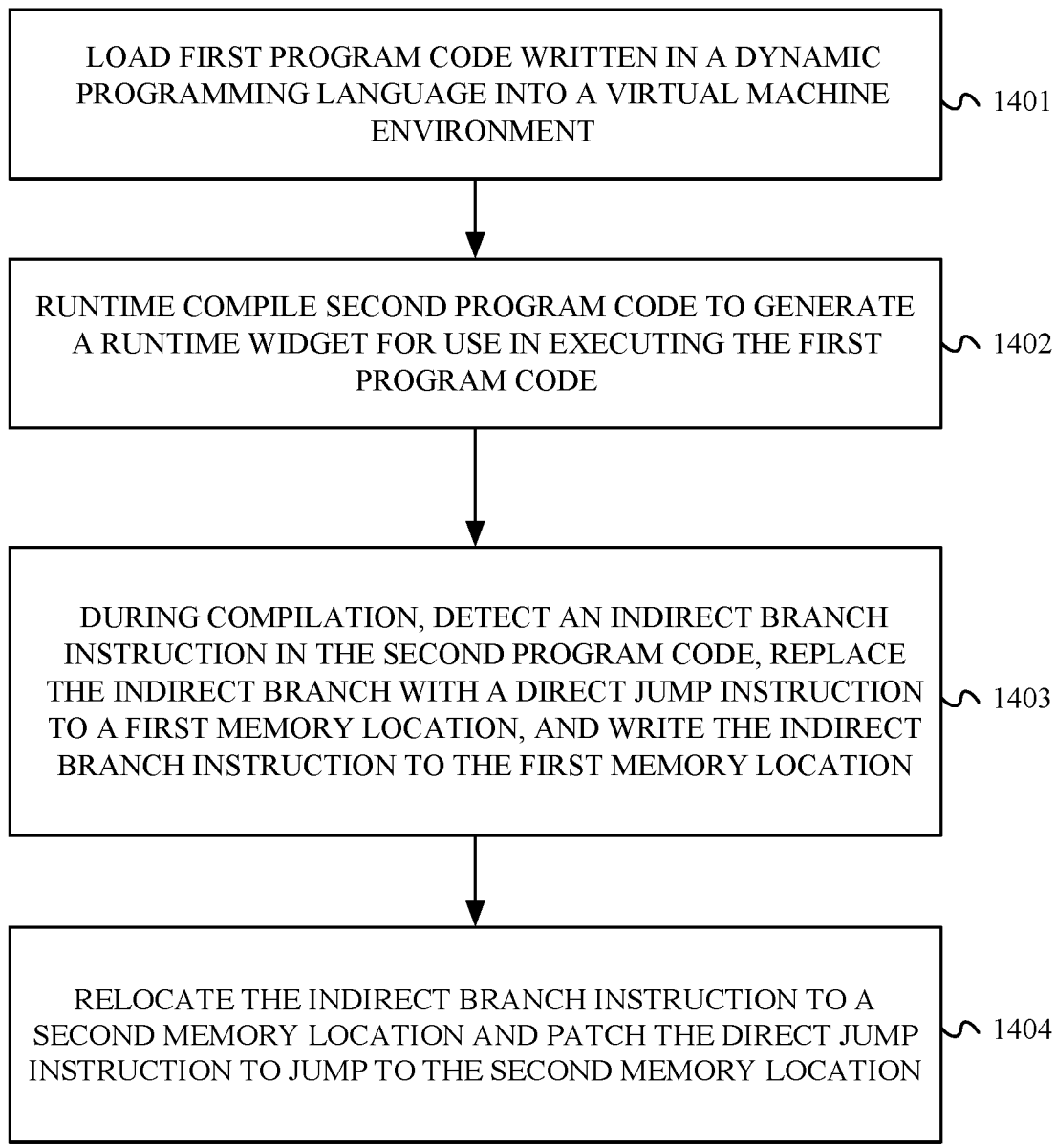
FIGS. 14A-14B are flow diagrams of methods of random jumping, according to embodiments described herein.
Figure 14B:
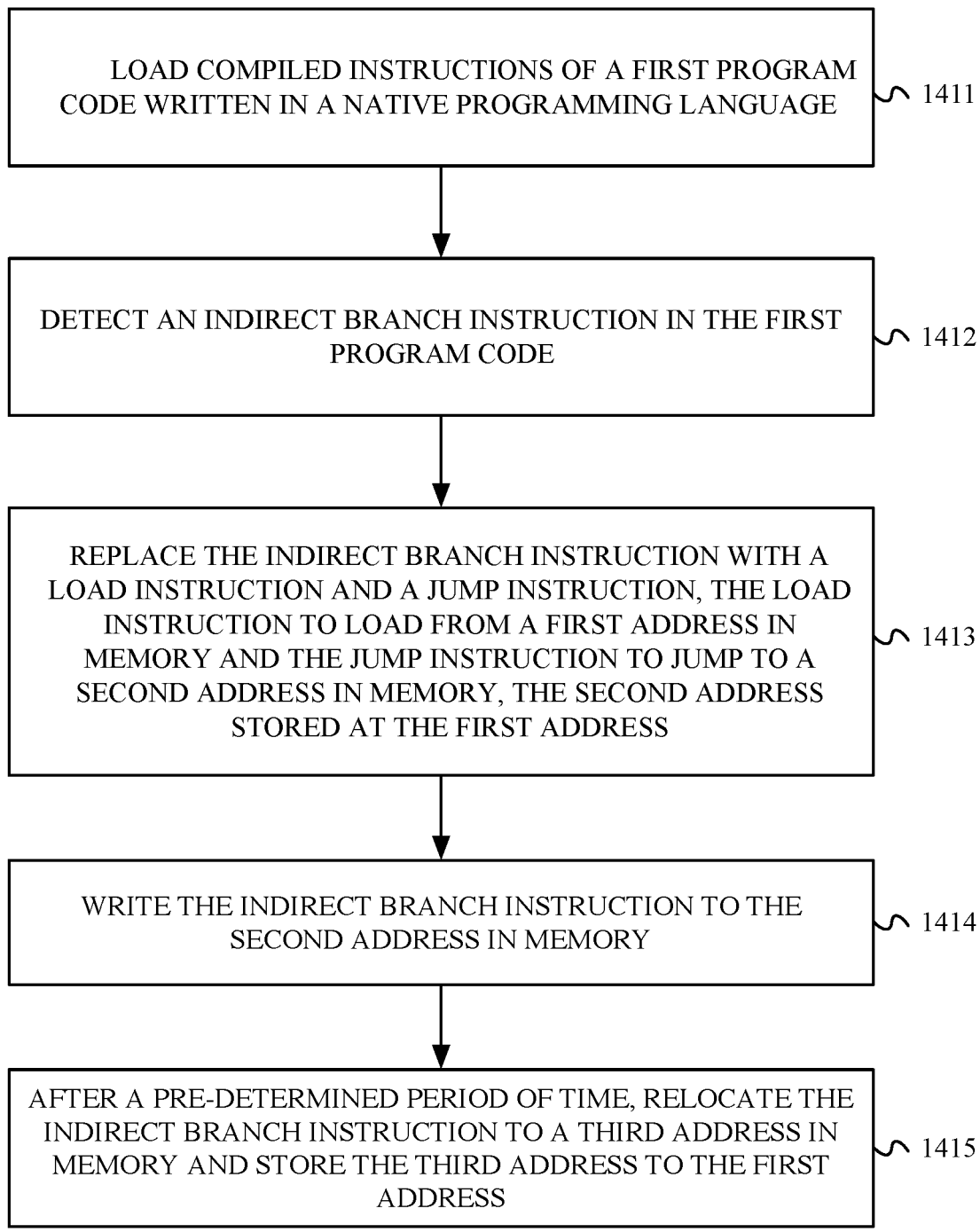

FIGS. 14A-14B are flow diagrams of methods of random jumping, according to an embodiment. FIG. 14A illustrates a flow diagram of a method 1400 of JIT-based random jumping. FIG. 14B illustrates a flow diagram of a method 1410 of random jumping for ahead-of-time compiled code.

The method 1400 of FIG. 14A includes to load first program code written in a dynamic programming language into a virtual machine environment, as shown at block 1401. The method 1400 can then runtime compile second program code to generate a runtime widget for use in executing the first program code, as shown at block 1402. The runtime widget can be, for example, an interpreter for use in interpreting the first program code. The interpreter can be a low-level interpreter for a JIT-compiled dynamic language. In one embodiment, the interpreter itself can be JIT-compiled. The runtime widget can also be a switch statement, a virtual function call, or another block of generated program code that includes an indirect branch. During compilation, the JIT-compiler can detect an indirect branch instruction in the second program code (the interpreter code, switch statement, virtual function call, etc.), replace the indirect branch with a direct jump instruction to a first memory location, and write the indirect branch instruction to the first memory location, as shown at block 1403. The method 1400 additionally includes to relocate the indirect branch instruction to a second memory location and patch the direct jump instruction to jump to the second memory location, as shown at block 1404. In one embodiment the JIT compiler can be used to patch the direct jump instruction. In one embodiment, the relocation can occur during interpretation of the first program code.

The method 1410 of FIG. 14B includes to load compiled instructions of a first program code written in a native programming language, as shown at block 1411. The method additionally includes to detect an indirect branch instruction in the first program code, as shown at block 1412. The method 1410 additionally includes to replace the indirect branch instruction with a load instruction and a jump instruction, the load instruction to load from a first address in memory and the jump instruction to jump to a second address in memory, the second address stored at the first address, as shown at shown at block 1413. The method 1410 additionally includes to write the indirect branch instruction to the second address in memory, as shown at block 1414. The method 1410 additionally includes, after a pre-determined period of time, to relocate the indirect branch instruction to a third address in memory and store the third address to the first address, as shown at block 1415.

Figure 15:
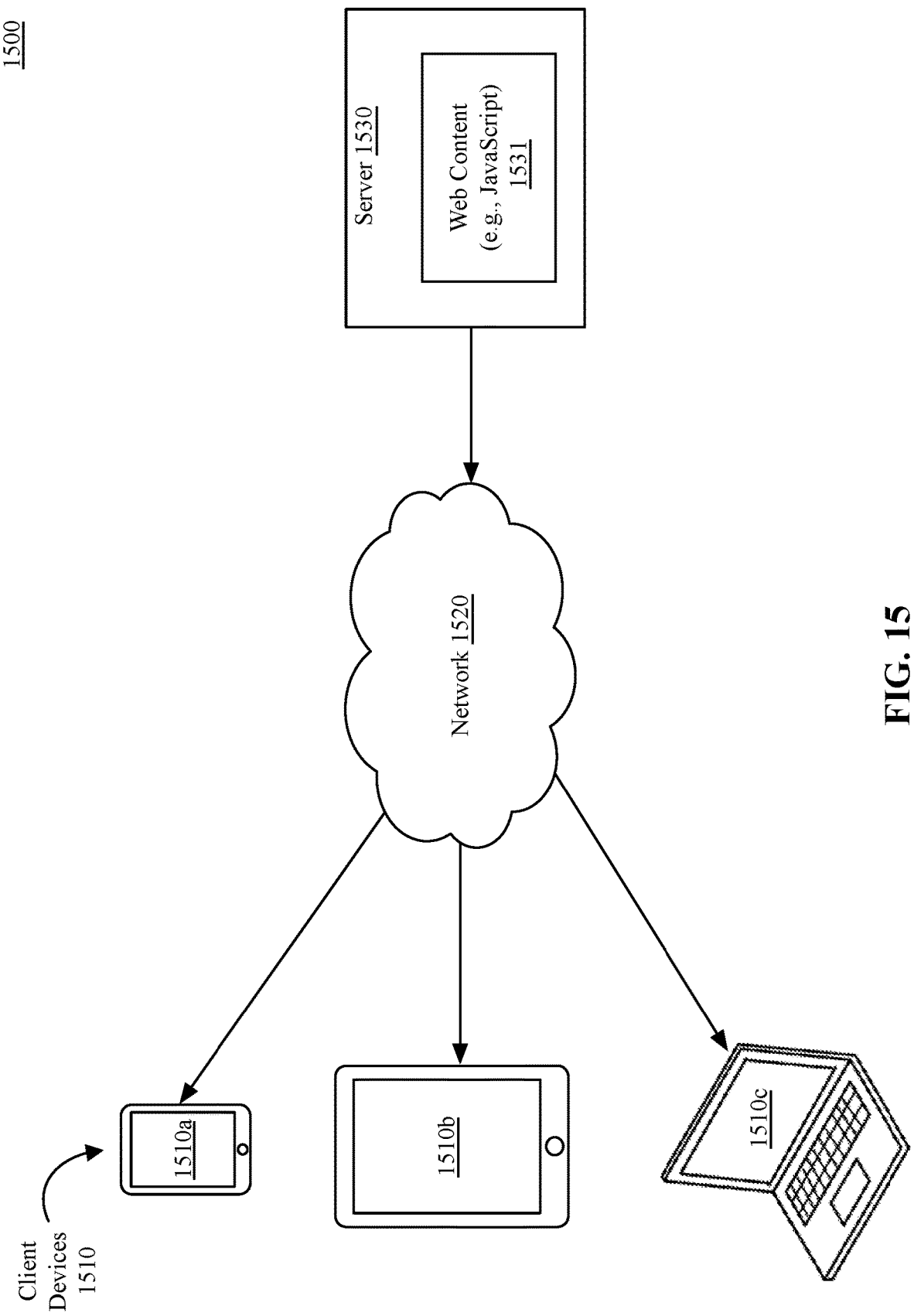
FIG. 15 illustrates a network system for providing dynamic web content to client devices.

FIG. 15 illustrates a network system for providing dynamic web content to client devices. A set of client devices 1510 (device 1510-1510c) can execute client applications, such as a web browser, that can be used to view web content 1531 hosted on a server 1530. The client devices 1510 can communicate with each other and the server 1530 via a network 1520. The network 1520 can include one or more interconnected networks including wide area networks (WAN) and local area networks (LAN). The wide area networks can include, but are not limited to, the Internet. The client devices 1510 can communicate with each other and the server 1530 using, for example, Internet protocols such as HTTP (Hypertext Transport Protocol) or other applicable protocols.

The client devices 1510 can include a variety of electronic devices including, but not limited to mobile electronic devices, desktop computer systems, laptop computer systems, tablet computer systems, personal digital assistants (PDAs) including cellular-enabled PDAs, set top boxes, entertainment systems, console gaming systems, wearable electronic devices, televisions, or other consumer electronic devices.

The server 1530 can be a web server that is a single web server or a cluster of web servers. The server 1530 can be or include a virtual server executing in a virtual machine, a cluster of physical servers, or a cluster of virtual servers. The server 1530 can also be part of a content delivery network or a cloud-based server system.

Content retrieved from server 1530 can include web pages based on hypertext languages, such as HTML (Hypertext Markup Language) or other markup language, embedded or linked (e.g., hyperlinked) with sources in a dynamic programming language, such as JavaScript. The client devices 1510 can dynamically download or fetch the linked sources for execution. In one embodiment, the client devices 1510 can dynamically compile the downloaded sources during runtime to improve execution performance.

Figure 16:
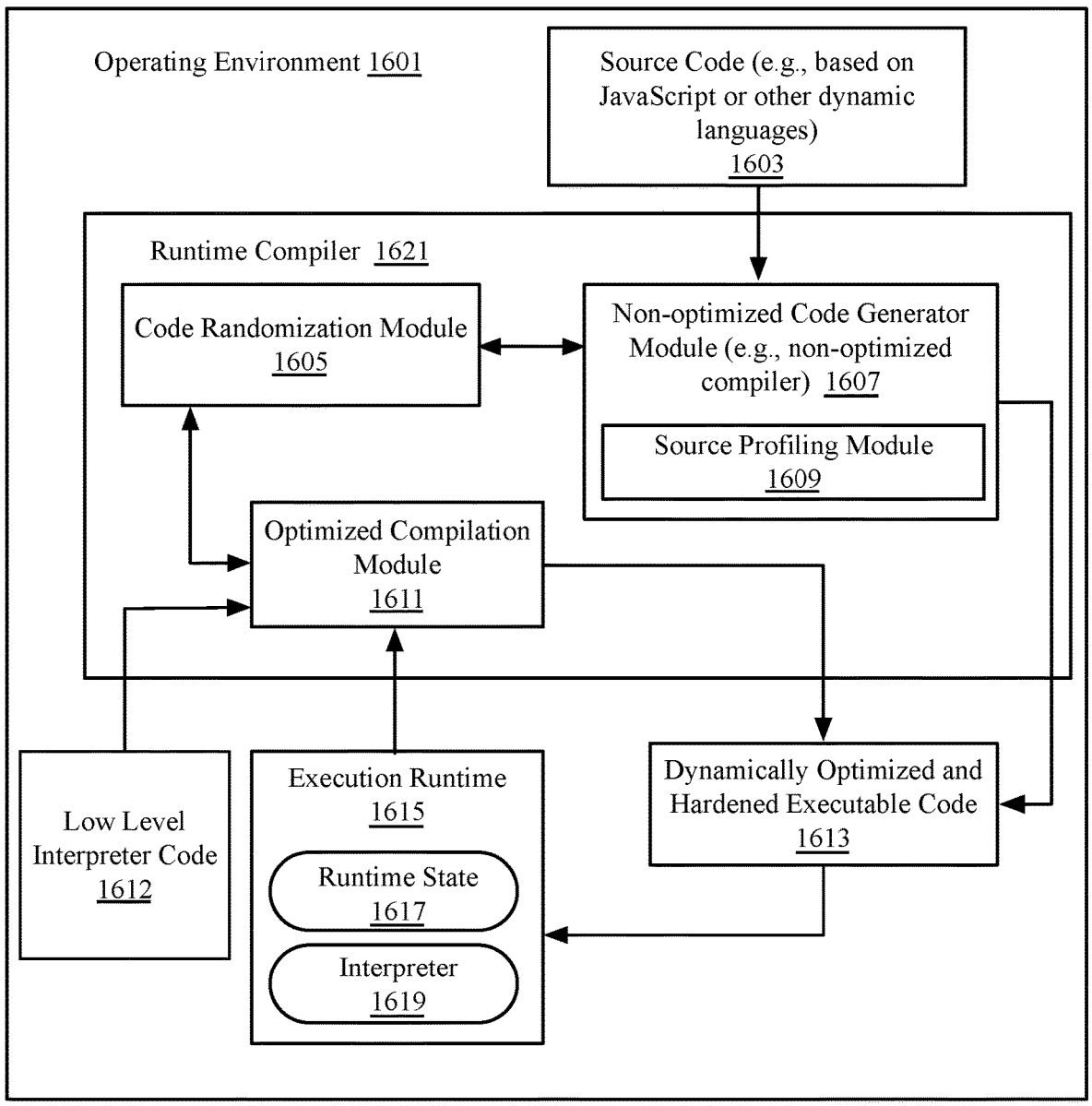
FIG. 16 is a block diagram illustrating one embodiment of a system for runtime compilation of dynamic programming languages.

FIG. 16 is a block diagram illustrating one embodiment of a system for runtime compilation of dynamic programming languages. In one embodiment, the system 1600 includes an operating environment 1601, such as an operating system hosting client application, such as a web browser. The operating environment can include runtime compiler 1621 that dynamically compiles source code 1603 into dynamically optimized and hardened executable code 1613. The source code 1603 can include comprise programs written in a dynamic programming language, such as JavaScript. In one embodiment, the source code 1603 can be retrieved from a remote device, such as server 1530 of FIG. 15, by a browser application running in the operating environment 1601. The runtime compiler 1621 and the execution runtime 1615 can be controlled by the browser application that is configured to perform browsing operations.

In one embodiment, the runtime compiler 1621 can include non-optimized code generator module 1607 to compile a subset of the source code 1603. The non-optimized code generator module 1607 can include a source profiling module 1609 to generate profiling information (e.g., code location identifiers, token keys, or other statically analyzed code data etc.) from the source code 1603. In some embodiments, the non-optimized code generator module 1607 can provide an initial version of the executable code 1613 which can then be dynamically updated and optimized during runtime via optimized an optimized compilation module 1611. The optimized compilation module can further include optimization logic to harden generated executable code against exploits of the speculative execution logic of the processor on which the operating environment 1601 executes. For example, the optimized compilation module can implement the exploit mitigations described herein.

In one embodiment an execution runtime 1615 can dynamically maintain a runtime state 1617 including, for example, data instances (e.g., objects or other data structures) created for executing source code 1603. The runtime compiler 1621 can include a code randomization module 1605 to introduce unpredictability between source code 1603 and executable code 1613 to protect against executing potential hidden executable code embedded inside source code 1603. In one embodiment the code randomization module 1605 can perform randomization operations for jump randomization techniques described herein.

In one embodiment, the operating environment includes a block of low-level interpreter code 1612 that can be compiled by the runtime compiler 1621 to generate a low-level interpreter 1619. Indirect branches in the interpreter 1619 can be dynamically adjusted to reduce the likelihood of the use of an exploit against the interpreter 1619. Alternatively, the low-level interpreter 1619 can be ahead-of-time compiled and loaded into the execution runtime 1615 by the operating environment 1601.

Figure 17A:
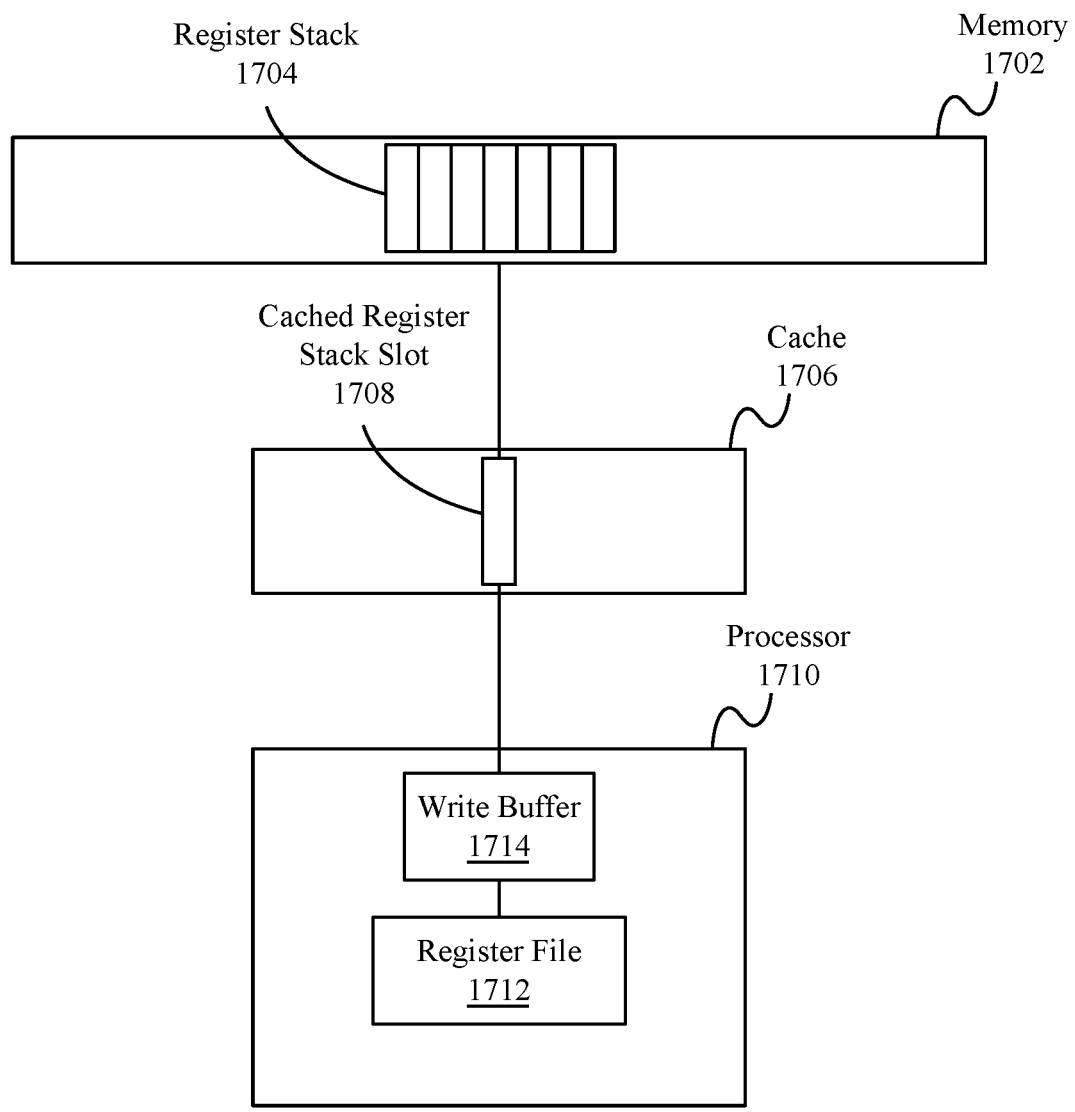
FIGS. 17A-17D illustrate a vulnerability and mitigation for compiler register allocation, according to an embodiment.
Figure 17B:
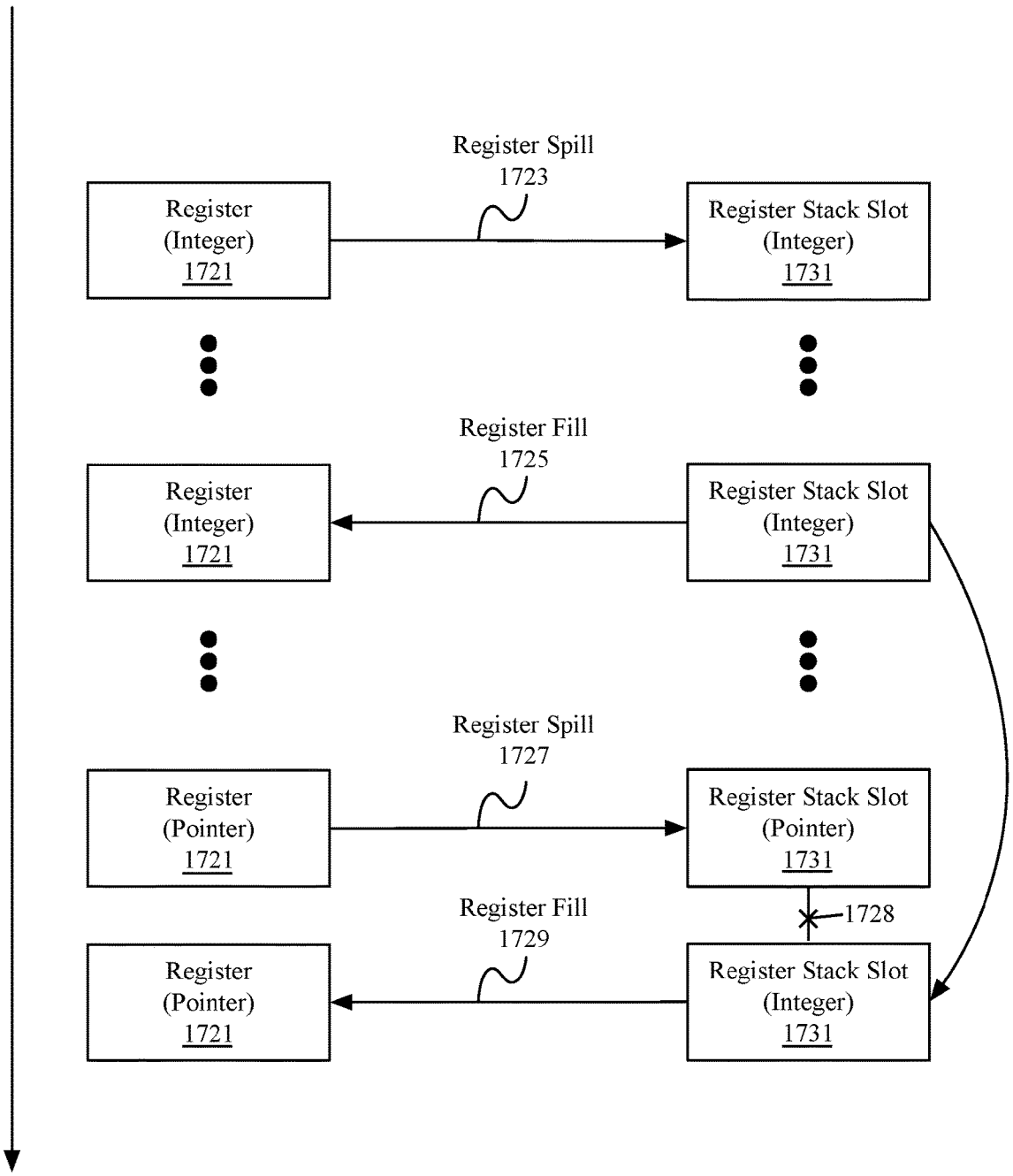
Figure 17C:
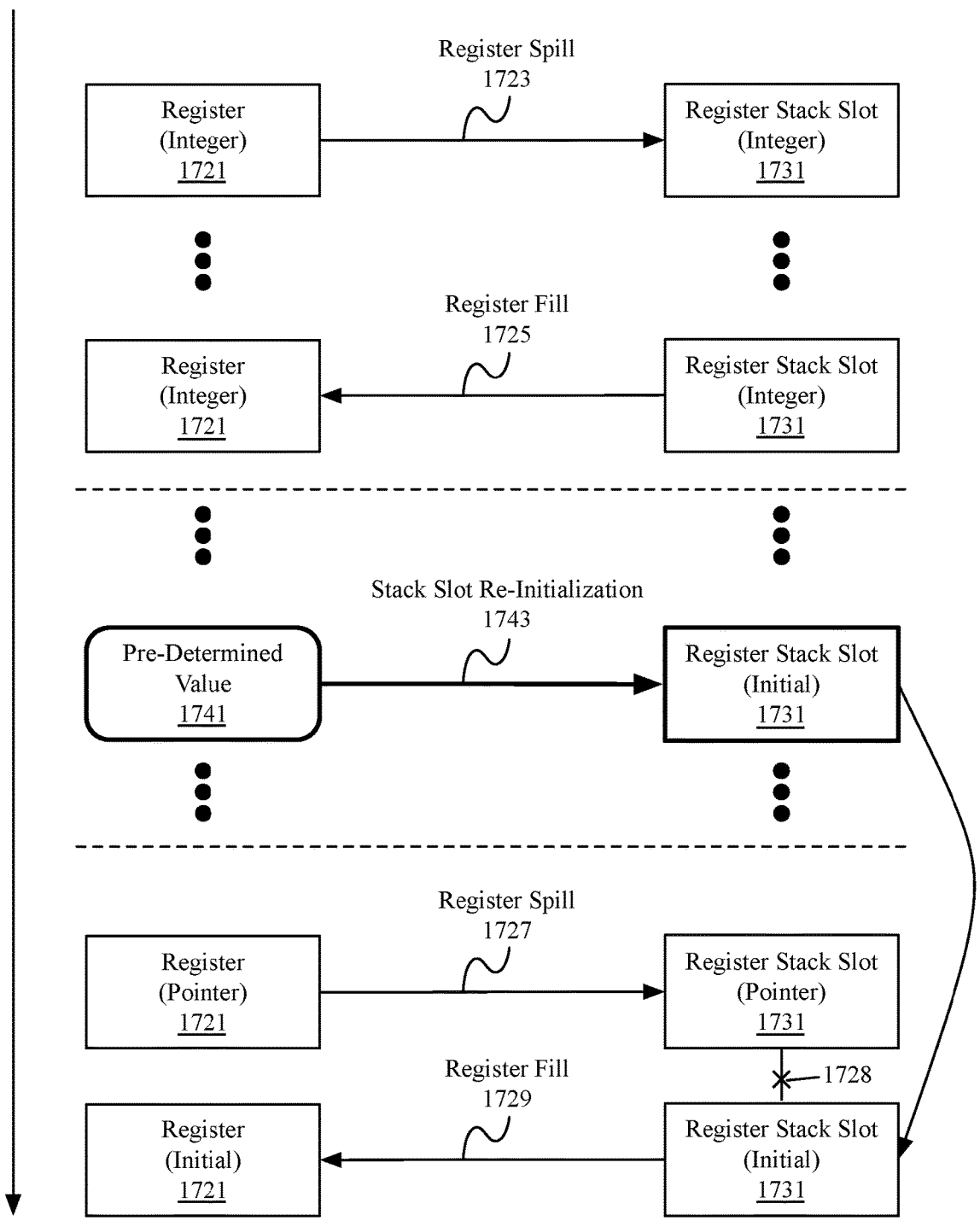

FIGS. 17A-17D illustrate a vulnerability to a register stack spill and fill system 1700, according to an embodiment. FIG. 17C illustrates a mitigation to the vulnerability shown in FIGS. 17A-17B. The register stack spill and fill system 1700 shown in FIG. 17A is controlled via the register allocation process, in which a compiler determines how to assign target program variables into the limited number of registers within the register file 1712 of a processor 1710. The processor 1710 can access data stored in the register file 1712 faster than data stored in an external cache 1706 or memory 1702. Thus, program code can be executed more quickly if the program makes efficient use of register space to store program data. As not all variables are live (in use) at the same time, multiple variables can be associated with the same register. However, only one of the variables may be stored in a given register at the same time. Accordingly, some variables may be spilled to memory 1702 when not in use. When the variable becomes live, the value for the register can be filled in from memory 1702. A register stack 1704 can store registers that are spilled to memory. In various type of processors, the register stack 1704 can be a dedicated region of memory that is used to store spilled registers or can be a general-purpose stack space. Spilled registers can be stored in the register stack 1704 in a last-in, first-out (LIFO) manner, in which the last register to be pushed (spilled) to the register stack 1704 is the first register to be popped (filled) from the stack. One or more slots within the register stack 1704 can also be stored in the cache 1706 as a cached register stack slot 1708.

During a register spill, a register value within the register file 1712 can be written to a write buffer 1714 while the processor 1710 prepares to write the data to memory 1702. The spilled register data can be stored in an associated cached register stack slot 1708, which can be one of multiple spilled registers that are stored in the cache 1706 before eventually being evicted to the register stack 1704 in memory 1702.

In some systems, a vulnerability exists in which, during a register fill, an incorrect register value may be speculatively filled from memory 1702. When a register value is spilled to a register stack as part of program register allocation management, an attacker can cause the processor to erroneously read an older value from the spilled register slot. For example, the processor may attempt to speculatively fill from a register stack location that is supposedly stores a pointer value and instead read a stale integer value instead. If the attacker has control over the integer value, the attacker may trick the processor into accessing that integer value as a pointer value, which may allow the attacker to read from an arbitrary memory location FIG. 17B illustrates a timeline 1720 for a register spill attack. A register 1721 can store a value of a specific data type, such as an integer data type. A register spill 1723 can occur which causes the value of the register 1721 to be stored to a register sack slot 1731 in memory. A subsequent register fill 1725 can restore the value to the register 1721 from the register stack slot. A potential attacker may be able to take advantage of the fact that, under some circumstances, the manner in which register stack slots are re-used is deterministic. Attacker can find a situation in which the compiler uses a particular register stack slot 1731 to spill an integer value that is under the attacker's control. After a period of time, the attacker can cause an additional register spill 1727 in which a pointer value is spilled to the same stack slot. Then in some executions of program code, during a register fill 1729 of the pointer value, the processor can be caused to bypass 1728 the register spill 1727 and erroneously read the integer value that was placed in memory as the result of the previous register spill 1723, causing the register fill 1729 to store the previous integer value into the register 1721 instead of the intended pointer value. The attacker may be able to construct a gadget to perform an arbitrary memory read by repeatedly triggering the occurrence of this erroneous operating condition. While the condition is triggered randomly, the attacker can increase the probability of this occurring by stressing the CPU and causing the CPU to perform a large number of operations, causing repeated spilling and filling of register data to the stack.

FIG. 17C illustrates a timeline 1740 in which the stack slot re-initialization mitigation is applied, according to an embodiment. One embodiment provides a mitigation technique in which any time a stack slot changes purpose, the slot is re-initialized to a per-determined value (e.g., zero). For example, a stack slot that transitions from being used to store an integer will be re-initialized before the slot is used to store a pointer. Thus, an attacker will be prevented from setting a known value to the stack slot and attempting to cause an erroneous condition in which the previously spilled known value is used to fill a register instead of the intended spilled value.

For example, a compiler, during register allocation, can determine that the register stack slot 1731 will no longer be used to store a specific type of data, or will soon otherwise be used for a different purpose, for example, to store a different type of data. The compiler can then perform stack slot re-initialization 1743 to initialize the register stack slot 1731 to a predetermined value, which can be zero, or another predetermined value. The stack slot re-initialized 1743 removes an attacker's ability to control the value in the register stack slot, and any erroneous fill will cause the register 1721 to be filled with the initialized register stack slot value.

In some processors, the timing of the stack slot re-initialization 1743 is a key consideration. Stack slot re-initialization 1743 should occur at least a sufficient number of cycles before the spill of the new data type is to occur, otherwise the processor may bypass the store of the re-initialization value to memory. In one embodiment, a compiler that implements stack re-initialization includes a cost model, which can be used to determine the number of clock cycles required for the processor to flush a store to memory to ensure that the re-initialization write occurs. The cost model is used to ensure that the re-initialization value is written sufficiently prior in advance to the actual data that will be stored, for example, at register spill 1727, otherwise the processor may collapse the spills and skip the re-initialization store. However, the re-initialization store cannot occur before the previously stored data in the register stack slot 1731 is no longer needed.

Figure 17D:
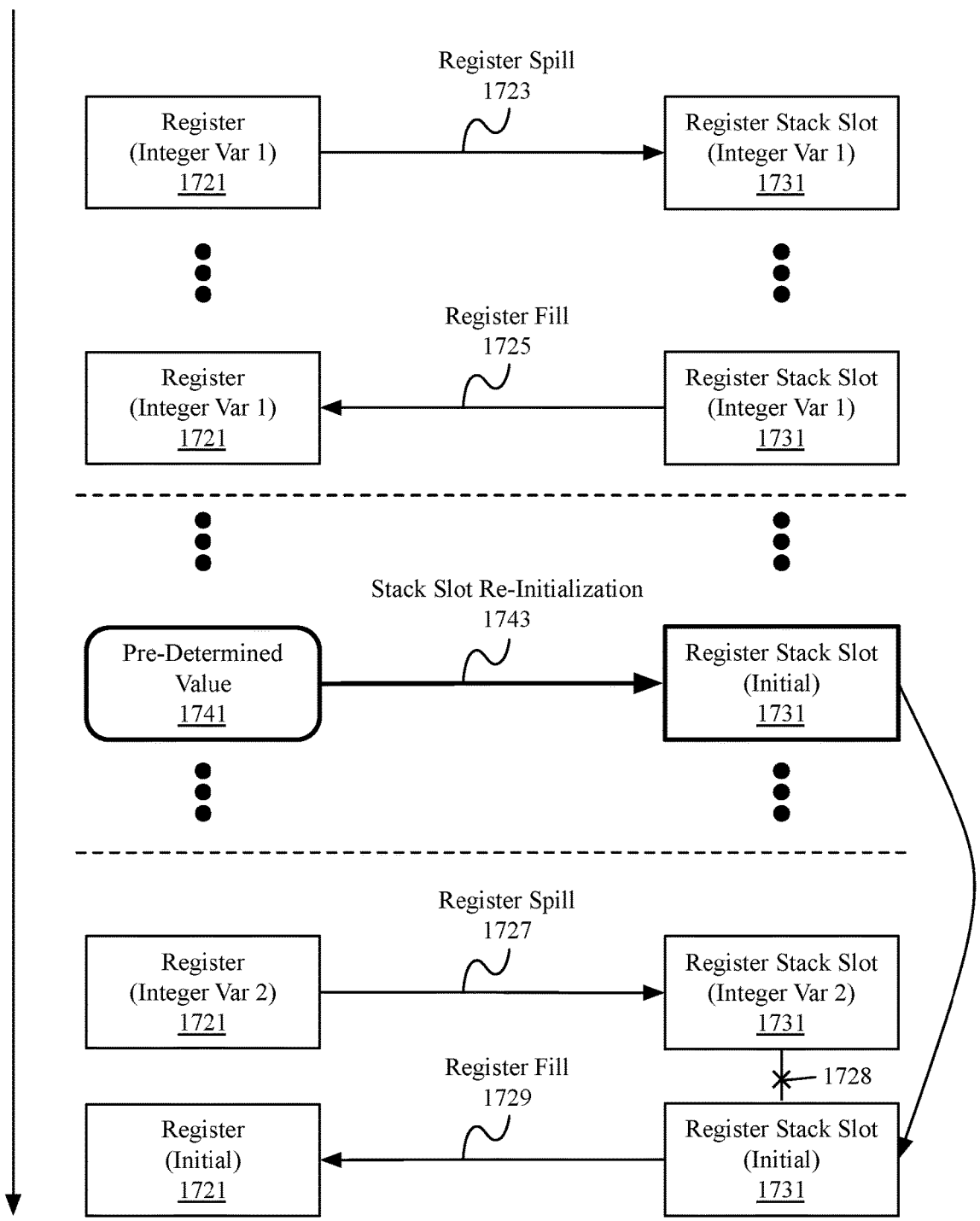

FIG. 17D illustrates an additional timeline 1750 in which the stack slot re-initialization mitigation is applied, according to an embodiment. One embodiment provides a mitigation technique in which any time a different variable is stored in a stack slot, the slot is re-initialized to a per-determined value (e.g., zero). For example, a stack slot that transitions from being used to store a first variable will be re-initialized before the slot is used to store a second variable, even if the variables share the same data type. As multiple variables share the same register stack slot, it may be possible for an exploit to be used to enable an attacker to read a variable that shares a register stack slot with a variable under the control of the attacker. Stack slot reinitialization can be used to mitigate against exploits against register stack slots that are shared by multiple variables.

For example, the register 1721 can be used to store a first integer variable. A register spill 1723 can result in the first integer value being stored to the register stack slot 1731. The spilled value can subsequently be restored to the register 1721. To prevent an exploit from accessing the value of the first integer variable, during register allocation a compiler can determine that the register stack slot 1731 will no longer be used to store the value of the first integer variable or will soon otherwise be used for a different purpose, for example, to store a value for a different integer variable. The compiler can then perform stack slot re-initialization 1743 to initialize the register stack slot 1731 to a predetermined value, which can be zero, or another predetermined value. The stack slot re-initialized 1743 removes an attacker's ability to access the previously stored value in the register stack slot, and any erroneous fill will cause the register 1721 to be filled with the initialized register stack slot value.

In this scenario, the timing of the stack slot re-initialization 1743 remains a key consideration. Stack slot re-initialization 1743 should occur at least a sufficient number of cycles before the spill of the new data type is to occur, otherwise the processor may bypass the store of the re-initialization value to memory.

Figure 18A:
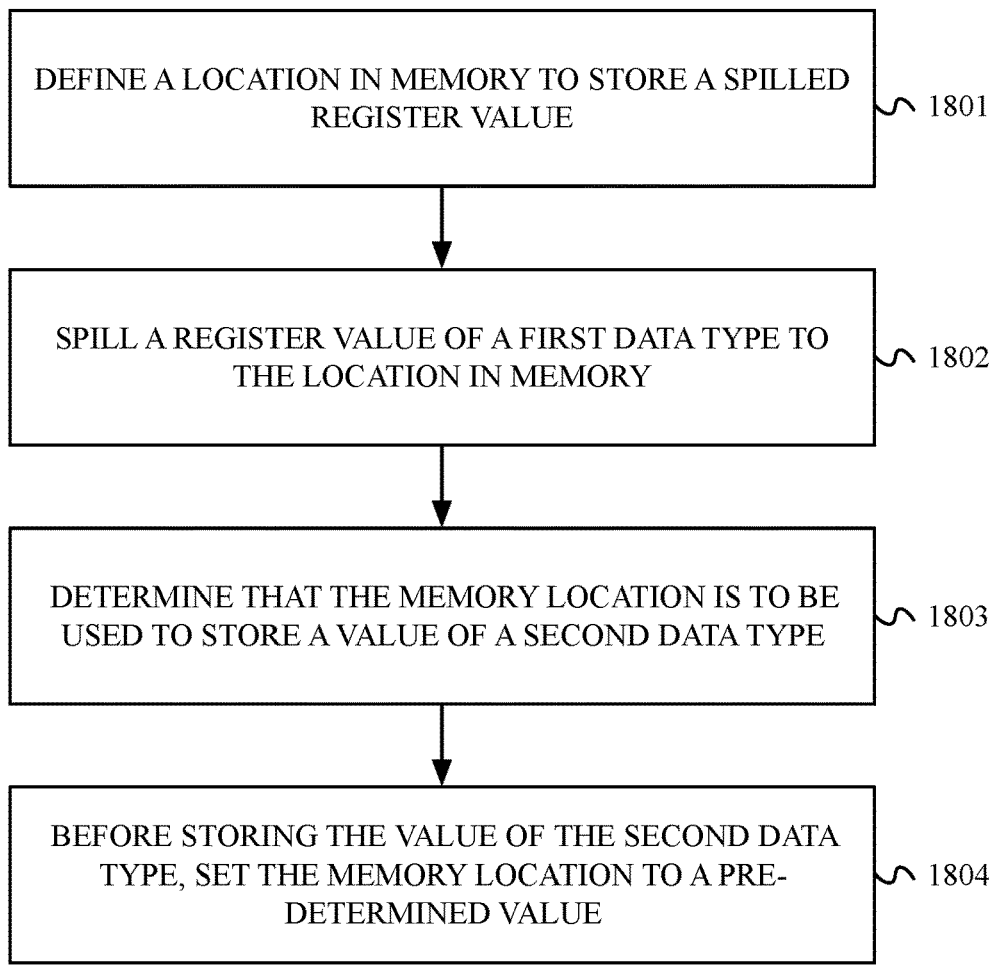
FIG. 18A-18B are flow diagrams illustrating methods to mitigate against a register fill vulnerability, according to embodiments described herein.
Figure 18B:
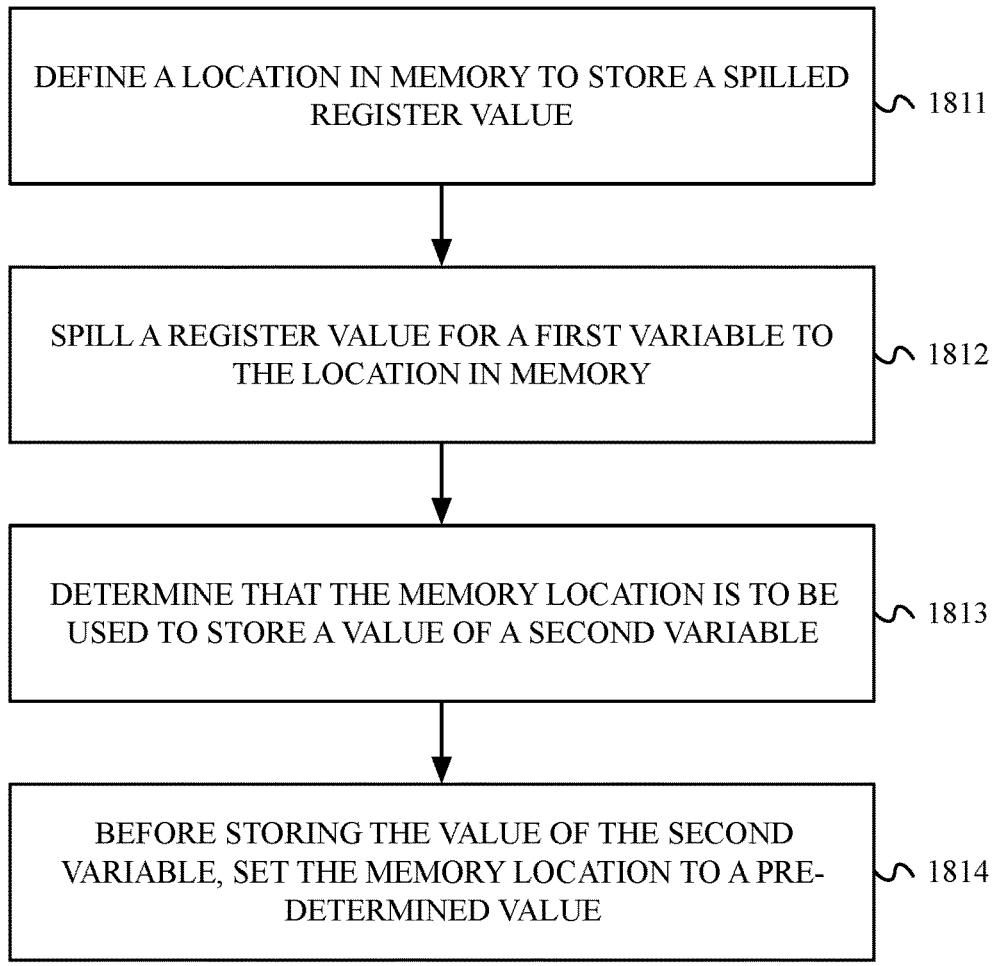

FIG. 18A-18B are flow diagram illustrating methods 1800, 1810 to mitigate against a register fill vulnerability. The methods 1800, 1810 can be performed by a compiler while compiling program code for execution. In one embodiment the methods 1800, 1810 can be performed by a runtime compiler for a dynamic programming language engine.

FIG. 18A illustrates one embodiment in which method 1800 includes to define a location in memory to store a spilled register value, as shown at block 1801. The method 1800 additionally includes to spill a register value of a first data type to the location in memory, as shown at block 1802. The method 1800 additionally includes to determine that the memory location is to be used to store a value of a second data type, as shown at block 1803. The method 1800 additionally includes, before storing the value of the second data type, to set the memory location to a pre-determined value, as shown at block 1804. In one embodiment, the memory location is set to the pre-determined value at least a threshold number of clock cycles before storing the value of the second data type to the pre-determined value. In such embodiment, the threshold number of cycles is determined based on a compiler cost model for the processor, which can be used to determine the number of clock cycles required for the processor to flush a store to memory. Attempting to re-initialize the memory location too close in time to storing the value of the second data type may result in the processor discarding the re-initialization store and instead storing only the value of the second data type.

FIG. 18B illustrates one embodiment in which method 1810 includes to define a location in memory to store a spilled register value, as shown at block 1811. The method 1810 additionally includes to spill a register value of a first variable to the location in memory, as shown at block 1812. The method 1810 additionally includes to determine that the memory location is to be used to store a value of a second data type, as shown at block 1813. The method 1810 additionally includes, before storing the value of the second variable, to set the memory location to a pre-determined value, as shown at block 1814. In one embodiment, the memory location is set to the pre-determined value at least a threshold number of clock cycles before storing the value of the second data type to the pre-determined value. In such embodiment, the threshold number of cycles is determined based on a compiler cost model for the processor, which can be used to determine the number of clock cycles required for the processor to flush a store to memory. Attempting to re-initialize the memory location too close in time to storing the value of the second data type may result in the processor discarding the re-initialization store and instead storing only the value of the second data type.

Figure 19:
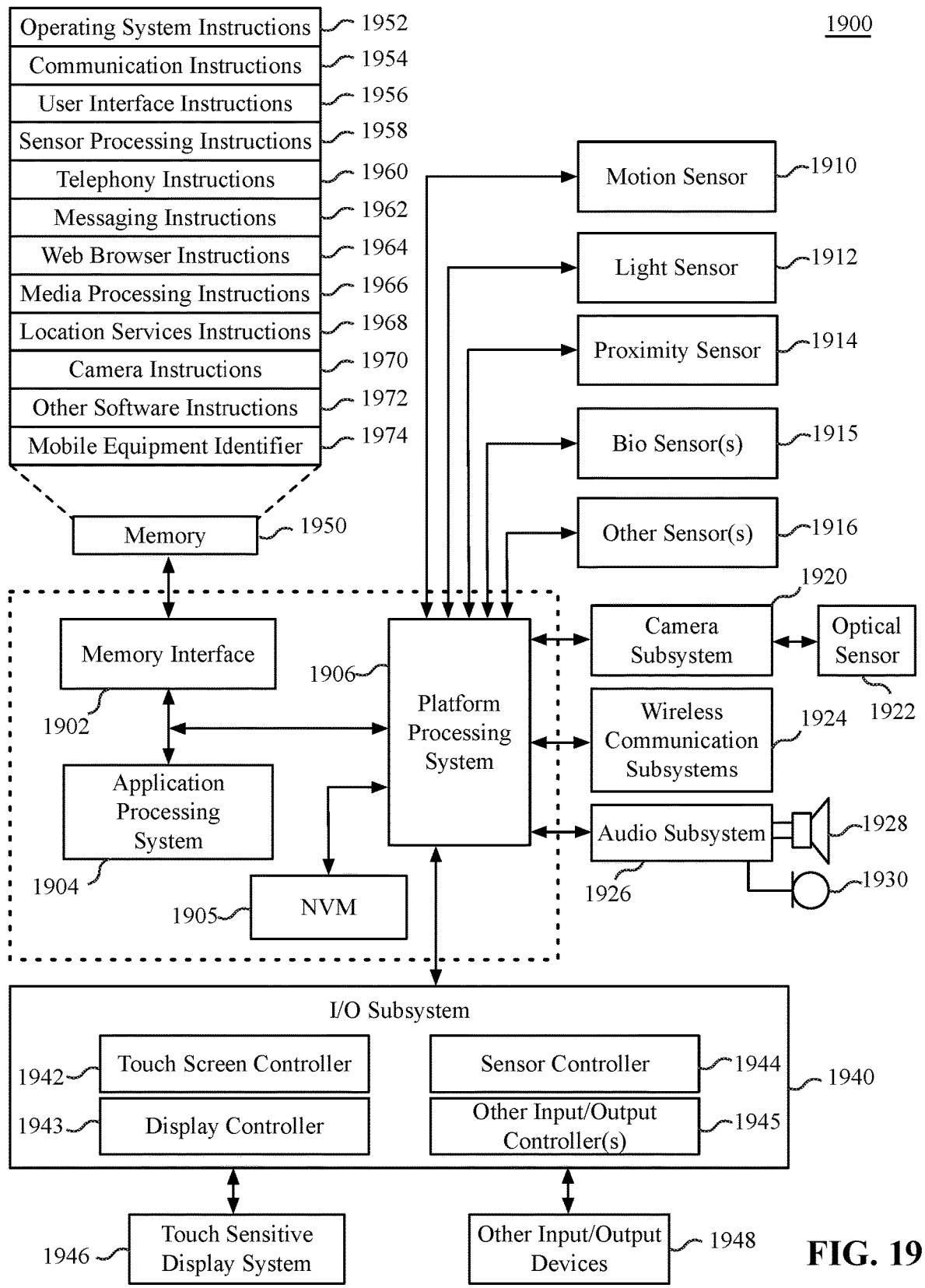
FIG. 19 is a block diagram of mobile device architecture, according to embodiments described herein.

FIG. 19 is a block diagram of mobile device architecture 1900, according to embodiments described herein. The mobile device architecture 1900 includes a memory interface 1902, a processing system 1904 including one or more data processors, image processors and/or graphics processing units, and a peripherals interface 1906. The various components can be coupled by one or more communication buses or signal lines. The various components can be separate logical components or devices or can be integrated in one or more integrated circuits, such as in a system on a chip integrated circuit.

The memory interface 1902 can be coupled to memory 1950, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1906 to facilitate multiple functionalities. For example, a motion sensor 1910, a light sensor 1912, and a proximity sensor 1914 can be coupled to the peripherals interface 1906 to facilitate the mobile device functionality. Other sensors 1916 can also be connected to the peripherals interface 1906, such as a positioning system (e.g., GPS receiver), a temperature sensor, a biometric sensor, or other sensing device, to facilitate related functionalities. A camera subsystem 1920 and an optical sensor 1922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1924, which can include radio frequency receivers and transmitters and/or optical (e.g., infrared) receivers and transmitters. The specific design and implementation of the communication subsystems 1924 can depend on the communication network(s) over which a mobile device is intended to operate. For example, a mobile device including the illustrated mobile device architecture 1900 can include wireless communication subsystems 1924 designed to operate over a GSM network, a CDMA network, an LTE network, a Wi-Fi network, a Bluetooth network, or any other wireless network. In particular, the wireless communication subsystems 1924 can provide a communications mechanism over which a client browser application can retrieve resources from a remote web server.

An audio subsystem 1926 can be coupled to a speaker 1928 and a microphone 1930 to facilitate voice-enabled functions, such as voice recognition, voice replication, digital recording, and telephony functions.

The I/O subsystem 1940 can include a touch screen controller 1942 and/or other input controller(s) 1945. The touch screen controller 1942 can be coupled to a touch sensitive display system 1946 (e.g., touch-screen). The touch sensitive display system 1946 and touch screen controller 1942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1946. Display output for the touch sensitive display system 1946 can be generated by a display controller 1943. In one embodiment the display controller 1943 can provide frame data to the touch sensitive display system 1946 at a variable frame rate.

In one embodiment a sensor controller 1944 is included to monitor, control, and/or processes data received from one or more of the motion sensor 1910, light sensor 1912, proximity sensor 1914, or other sensors 1916. The sensor controller 1944 can include logic to interpret sensor data to determine the occurrence of one of more motion events or activities by analysis of the sensor data from the sensors.

In one embodiment the I/O subsystem 1940 includes other input controller(s) 1945 that can be coupled to other input/control devices 1948, such as one or more buttons, rocker switches, thumb-wheel, infrared port, USB port, and/or a pointer device such as a stylus, or control devices such as an up/down button for volume control of the speaker 1928 and/or the microphone 1930.

In one embodiment, the memory 1950 coupled to the memory interface 1902 can store instructions for an operating system 1952, including portable operating system interface (POSIX) compliant and non-compliant operating system or an embedded operating system. The operating system 1952 may include instructions for handling basic system services and for performing hardware dependent tasks. In some implementations, the operating system 1952 can be a kernel.

The memory 1950 can also store communication instructions 1954 to facilitate communicating with one or more additional devices, one or more computers and/or one or more servers, for example, to retrieve web resources from remote web servers. The memory 1950 can also include user interface instructions 1956, including graphical user interface instructions to facilitate graphic user interface processing.

Additionally, the memory 1950 can store sensor processing instructions 1958 to facilitate sensor-related processing and functions; telephony instructions 1960 to facilitate telephone-related processes and functions; messaging instructions 1962 to facilitate electronic-messaging related processes and functions; web browser instructions 1964 to facilitate web browsing-related processes and functions; media processing instructions 1966 to facilitate media processing-related processes and functions; location services instructions including GPS and/or navigation instructions 1968 and Wi-Fi based location instructions to facilitate location based functionality; camera instructions 1970 to facilitate camera-related processes and functions; and/or other software instructions 1972 to facilitate other processes and functions, e.g., security processes and functions, and processes and functions related to the systems. The memory 1950 may also store other software instructions such as web video instructions to facilitate web video-related processes and functions; and/or web shopping instructions to facilitate web shopping-related processes and functions. In some implementations, the media processing instructions 1966 are divided into audio processing instructions and video processing instructions to facilitate audio processing-related processes and functions and video processing-related processes and functions, respectively. A mobile equipment identifier, such as an International Mobile Equipment Identity (IMEI) 1974 or a similar hardware identifier can also be stored in memory 1950.

Each of the above identified instructions and applications can correspond to a set of instructions for performing one or more functions described above. These instructions need not be implemented as separate software programs, procedures, or modules. The memory 1950 can include additional instructions or fewer instructions. Furthermore, various functions may be implemented in hardware and/or in software, including in one or more signal processing and/or application specific integrated circuits.

Figure 20:
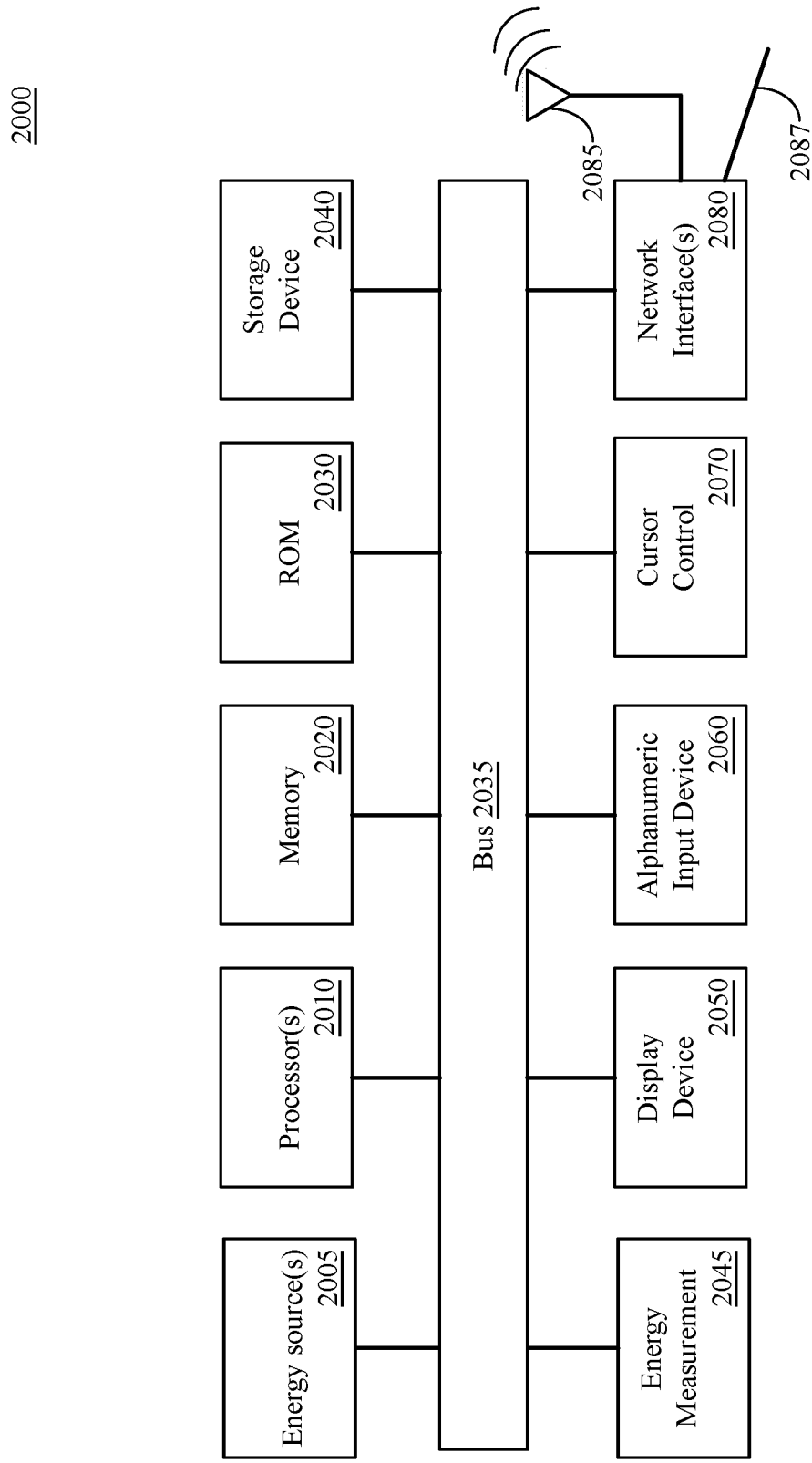
FIG. 20 is a block diagram of one embodiment of a computing system, according to embodiments described herein.

FIG. 20 is a block diagram of one embodiment of a computing system 2000, according to embodiments described herein. The computing system illustrated in Figure is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 20 may be used to provide the computing device and/or the server device.

Computing system 2000 includes bus 2035 or other communication device to communicate information, and processor(s) 2010 coupled to bus 2035 that may process information.

While computing system 2000 is illustrated with a single processor, computing system 2000 may include multiple processors and/or co-processors 2010. Computing system 2000 further may include random access memory (RAM) or other dynamic storage device (e.g., main memory 2020), coupled to bus 2035 and may store information and instructions that may be executed by processor(s) 2010. Main memory 2020 may also be used to store temporary variables or other intermediate information during execution of instructions by processor(s) 2010.

Computing system 2000 may also include read only memory (ROM) 2030 and/or another data storage device 2040 coupled to bus 2035 that may store information and instructions for processor(s) 2010. Data storage device 2040 may be coupled to bus 2035 to store information and instructions. Data storage device 2040 such as flash memory or a magnetic disk or optical disc and corresponding drive may be coupled to computing system 2000.

Computing system 2000 may also be coupled via bus 2035 to display device 2050 to display information to a user. Computing system 2000 can also include an alphanumeric input device 2060, including alphanumeric and other keys, which may be coupled to bus 2035 to communicate information and command selections to processor(s) 2010. Another type of user input device is cursor control 2070, such as a touchpad, a mouse, a trackball, or cursor direction keys to communicate direction information and command selections to processor(s) 2010 and to control cursor movement on display device 2050. Computing system 2000 may also receive user input from a remote device that is communicatively coupled to computing system 2000 via one or more network interface(s) 2080.

Computing system 2000 further may include one or more network interface(s) 2080 to provide access to a network, such as a local area network. Network interface(s) 2080 may include, for example, a wireless network interface having antenna 2085, which may represent one or more antenna(e). Computing system 2000 can include multiple wireless network interfaces such as a combination of Wi-Fi, Bluetooth®, near field communication (NFC), and/or cellular telephony interfaces. Network interface(s) 2080 may also include, for example, a wired network interface to communicate with remote devices via network cable 2087, which may be, for example, an Ethernet cable, a coaxial cable, a fiber optic cable, a serial cable, or a parallel cable.

In one embodiment, network interface(s) 2080 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2080 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

Computing system 2000 can further include one or more energy sources 2005 and one or more energy measurement systems 2045. Energy sources 2005 can include an AC/DC adapter coupled to an external power source, one or more batteries, one or more charge storage devices, a USB charger, or other energy source. Energy measurement systems include at least one voltage or amperage measuring device that can measure energy consumed by the computing system 2000 during a pre-determined period of time. Additionally, one or more energy measurement systems can be included that measure, e.g., energy consumed by a display device, cooling subsystem, Wi-Fi subsystem, or other frequently used or high-energy consumption subsystem.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

Embodiments described herein provide for virtual machine (VM) based exploit mitigation techniques that can be used to harden web content frameworks and JavaScript Engines. Some embodiments described herein are also generally applicable to other system frameworks, libraries, and program code that executes on a processor that is vulnerable to an attack. Program code that implements the techniques described herein can prevent the use of vulnerability attacks to bypass security properties within the program code.

One embodiment provides a data processing system comprising memory to store instructions which, when executed, provides a virtual machine and one or more processors to execute the instructions. The instructions cause the one or more processors to load program code into the virtual machine; identify a pointer within the program code, the pointer having a first value; modify the pointer with a first key value to change the pointer to a second value; and before a dereference of the pointer, apply a second key value to the pointer, wherein the pointer is restored to the first value when the first key value equals the second key value.

A further embodiment includes a data processing system comprising memory to store instructions which, when executed, provides a virtual machine and one or more processors to execute the instructions. The instructions can cause the one or more processors to load program code into the virtual machine; identify a pointer within the program code, the pointer within a data structure that includes a stored type value and a protected value, wherein the program code includes a binary branch to verify the type value before an access to the protected value; set a value at a memory location, the value set equal to output of an XOR operation between the stored type value and a checked type value; and before a dereference of a pointer to the protected value, modify the pointer to the protected value based on the value at the memory location, wherein the value at the memory location is zero when the stored type value and the checked type value are equal.

One embodiment provides for a non-transitory machine-readable medium storing instructions which, when executed by one or more processors, cause the one or more processors to perform operations including loading program code into a dynamic programming language interpreter associated with a virtual machine; detecting an indirect branch where source and destination communicate state information via a register; before the indirect branch, encoding the state information using a first key, the first key based on a destination of the indirect branch; and at the destination of the indirect branch, decoding the state information using a second key, the second key based on a program counter value for the virtual machine.

One embodiment provides for a non-transitory machine-readable medium storing instructions which, when executed by one or more processors, cause the one or more processors to perform operations including loading program code into a dynamic programming language interpreter associated with a virtual machine; interpreting an instruction of the program code; before an indirect branch to a next instruction of the program code, encoding state information associated with the program code using a first key, the first key based on a destination of the indirect branch; and after executing the indirect branch to the next instruction, decoding the state information using a second key, the second key based on a program counter value for the virtual machine.

One embodiment provides for a non-transitory machine-readable medium storing instructions which, when executed by one or more processors, cause the one or more processors to perform operations including creating an allocation cache from which to allocate memory for program code written in a dynamic programming language; determining that a runtime allocation is to be performed for an object of the program code; determining a security origin of the object; and allocating memory for the object from a portion of the allocation cache associated with the security origin of the object, wherein the memory for the object is at least a pre-determined number of bytes away from any object having a different security origin.

One embodiment provides for a non-transitory machine-readable medium storing instructions which, when executed by one or more processors, cause the one or more processors to perform operations including loading first program code written in a dynamic programming language into a virtual machine environment; runtime compiling second program code to generate an interpreter for the first program code; while compiling the second program code, detecting an indirect branch instruction in the second program code, replacing the indirect branch with a direct jump instruction to a first memory location, and writing the indirect branch instruction to the first memory location; and while interpreting the first program code with the interpreter, relocating the indirect branch instruction to a second memory location and patching the direct jump instruction to jump to the second memory location.

One embodiment provides for a non-transitory machine-readable medium storing instructions which, when executed by one or more processors, cause the one or more processors to perform operations including loading compiled instructions of a first program code written in a native programming language; detecting an indirect branch instruction in the first program code; replacing the indirect branch instruction with a load instruction and a jump instruction, the load instruction to load from a first address in memory, the first address controlled by a virtual machine, and the jump instruction to jump to a second address in memory, the second address stored at the first address; writing the indirect branch instruction to the second address in memory; and after a pre-determined period of time, relocating the indirect branch instruction to a third address in memory and storing the third address to the first address.

One embodiment provides for a computer-implemented method for compiling a set of program code for execution, the method comprising defining a location in memory to store a spilled register value; spilling a register value of a first variable to the location in memory; determining that the memory location is to be used to store a second variable; and before storing the value of the second variable, setting the memory location to a pre-determined value.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A data processing system comprising:
memory to store instructions which, when executed, provide a virtual machine; one or more processors to execute the instructions, wherein the instructions cause the one or more processors to:
load program code into the virtual machine;
identify a pointer within the program code loaded into the virtual machine, the pointer having a first value;
modify, during execution of the program code in the virtual machine, the pointer with a first key value to change the pointer to a second value; and
before a dereference of the pointer, apply a second key value to the pointer, wherein the pointer is restored to the first value when the first key value equals the second key value.

2. The data processing system as in claim 1, wherein the first key value associated with a specified data type for the pointer and the second key value associated with the data type used to dereference the pointer.

3. The data processing system as in claim 2, wherein the second value is an unmapped virtual memory address.

4. The data processing system as in claim 2, wherein the second value is an invalid virtual memory address.

5. The data processing system as in claim 1, wherein the first value is a memory address of a protected value.

6. The data processing system as in claim 5, wherein the instructions include a type check to gate access to the protected value.

7. The data processing system as in claim 6, wherein the one or more processors include speculative execution logic to bypass the type check and speculatively access the protected value.

8. The data processing system as in claim 7, wherein during speculative access of the protected value, at least one of the one or more processors is to apply a third key value to the pointer, the third key value differing from the first key value, and cause the pointer to point to an unmapped or invalid virtual memory address.

9. The data processing system of claim 1, wherein modifying the pointer comprises adding, subtracting or XORing the first key value to the first value.

10. The data processing system of claim 1, wherein when the second key value does not equal the first key value, applying the second key value results in a third value, the third value being an unmapped memory address.

11. The data processing system of claim 1, wherein the first key value is stored in a pre-determined number of bits of a memory address corresponding to the pointer.

12. A non-transitory machine-readable medium storing instructions which, when executed by one or more processors, cause the one or more processors to perform operations including:
loading program code into a virtual machine;
identifying a pointer within the program code loaded into the virtual machine, the pointer having a first value;
modifying, during execution of the program in the virtual machine, the pointer with a first key value to change the pointer to a second value; and
before a dereference of the pointer, applying a second key value to the pointer, wherein the pointer is restored to the first value when the first key value equals the second key value.

13. The non-transitory machine-readable medium of claim 12, wherein the first key value associated with a specified data type for the pointer and the second key value associated with the data type used to dereference the pointer.

14. The non-transitory machine-readable medium of claim 13, wherein the second value is an unmapped virtual memory address.

15. The non-transitory machine-readable medium of claim 13, wherein the second value is an invalid virtual memory address.

16. The non-transitory machine-readable medium of claim 12, wherein the first value is a memory address of a protected value.

17. The non-transitory machine-readable medium of claim 16, wherein the operations include using a type check to gate access to the protected value.

18. The non-transitory machine-readable medium of claim 17, wherein the operations include using speculative execution logic to bypass the type check and speculatively access the protected value.

19. The non-transitory machine-readable medium of claim 18, wherein the operations further comprise:
during speculative access of the protected value, applying a third key value to the pointer, the third key value differing from the first key value, and causing the pointer to point to an unmapped or invalid virtual memory address.

20. The non-transitory machine-readable medium of claim 12, wherein modifying the pointer comprises adding, subtracting or XORing the first key value to the first value.

21. The non-transitory machine-readable medium of claim 12, wherein when the second key value does not equal the first key value, applying the second key value results in a third value, the third value being an unmapped memory address.

22. The non-transitory machine-readable medium of claim 12, wherein the first key value is stored in a predetermined number of bits of a memory address corresponding to the pointer.

23. A computer-implemented method comprising:
loading program code into a virtual machine;
identifying a pointer within the program code loaded into the virtual machine, the pointer having a first value;
modifying, during execution of the program in the virtual machine, the pointer with a first key value to change the pointer to a second value; and
before a dereference of the pointer, applying a second key value to the pointer, wherein the pointer is restored to the first value when the first key value equals the second key value.

24. The computer-implemented method of claim 23, wherein the first key value associated with a specified data type for the pointer and the second key value associated with the data type used to dereference the pointer.

25. The computer-implemented method of claim 24, wherein the second value is an unmapped virtual memory address.

26. The computer-implemented method of claim 24, wherein the second value is an invalid virtual memory address.

27. The computer-implemented method of claim 23, wherein the first value is a memory address of a protected value.

28. The computer-implemented method of claim 27, wherein the method further comprises using a type check to gate access to the protected value.

29. The computer-implemented method of claim 28, wherein the method further comprises using speculative execution logic to bypass the type check and speculatively access the protected value.

30. The computer-implemented method of claim 29, wherein the method further comprises:
during speculative access of the protected value, applying a third key value to the pointer, the third key value differing from the first key value, and causing the pointer to point to an unmapped or invalid virtual memory address.

31. The computer-implemented method of claim 23, wherein modifying the pointer comprises adding, subtracting or XORing the first key value to the first value.

32. The computer-implemented method of claim 23, wherein when the second key value does not equal the first key value, applying the second key value results in a third value, the third value being an unmapped memory address.

* * * * *